US009363954B2

(12) United States Patent
Davidson et al.

(10) Patent No.: US 9,363,954 B2
(45) Date of Patent: Jun. 14, 2016

(54) ATMOSPHERIC DELIVERY SYSTEM

(75) Inventors: Peter Davidson, Onchan (IM); Hugh Edmund Murray Hunt, Cambridge (GB); Christopher John Burgoyne, Cambridge (GB)

(73) Assignee: Davidson Technology Limited, Onchan (IM)

( * ) Notice: Subject to any disclaimer, the term of this patent is extended or adjusted under 35 U.S.C. 154(b) by 301 days.

(21) Appl. No.: 13/514,508

(22) PCT Filed: Dec. 15, 2010

(86) PCT No.: PCT/GB2010/052090
§ 371 (c)(1),
(2), (4) Date: Jun. 7, 2012

(87) PCT Pub. No.: WO2011/073650
PCT Pub. Date: Jun. 23, 2011

(65) Prior Publication Data
US 2012/0241554 A1    Sep. 27, 2012

(30) Foreign Application Priority Data

Dec. 15, 2009  (GB) .................................. 0921879.3
Mar. 12, 2010  (GB) .................................. 1004146.5

(51) Int. Cl.
*B64B 1/06* (2006.01)
*A01G 15/00* (2006.01)
*D07B 1/12* (2006.01)

(52) U.S. Cl.
CPC *A01G 15/00* (2013.01); *D07B 1/12* (2013.01); *D07B 2201/106* (2013.01); *D07B 2201/1096* (2013.01)

(58) Field of Classification Search
CPC ............ A01G 15/00; B64B 1/06; D07B 1/12; D07B 2201/106; D07B 2201/1096
USPC .................. 244/30, 136, 33, 31; 239/14.1
See application file for complete search history.

(56) References Cited

U.S. PATENT DOCUMENTS 1,426,338 A * 8/1922 Sperry ............................ 116/18
3,381,922 A * 5/1968 Laing ............................ 244/136
(Continued)

FOREIGN PATENT DOCUMENTS

| DE | 19518471 A1 | 7/1996 |
| GB | 2446250 A | 8/2008 |
| GB | 2448591 A | 10/2008 |
| WO | WO 94/19239 | 9/1994 |

OTHER PUBLICATIONS

Volcanoes and Climate Change by Jason Wolfe Sep. 5, 2000.*
(Continued)

*Primary Examiner* — Christopher P Ellis
*Assistant Examiner* — Jessica Wong
(74) *Attorney, Agent, or Firm* — DASCENZO Intellectual Property Law, P.C.

(57) ABSTRACT

The invention relates to an apparatus for transporting and dispersing solid particles into the earth's stratosphere, comprising a conduit connecting a substantially ground level location to an elevated location, a particle transport means, and a deagglomeration means coupled with a dispersal means, wherein the deagglomeration means and dispersal means are located at an elevated location, and to a method of transporting particles of high refractive index into the stratosphere as well as to an aircraft and to a cloud thus formed.

35 Claims, 19 Drawing Sheets

(56) References Cited

U.S. PATENT DOCUMENTS

Figure 9:
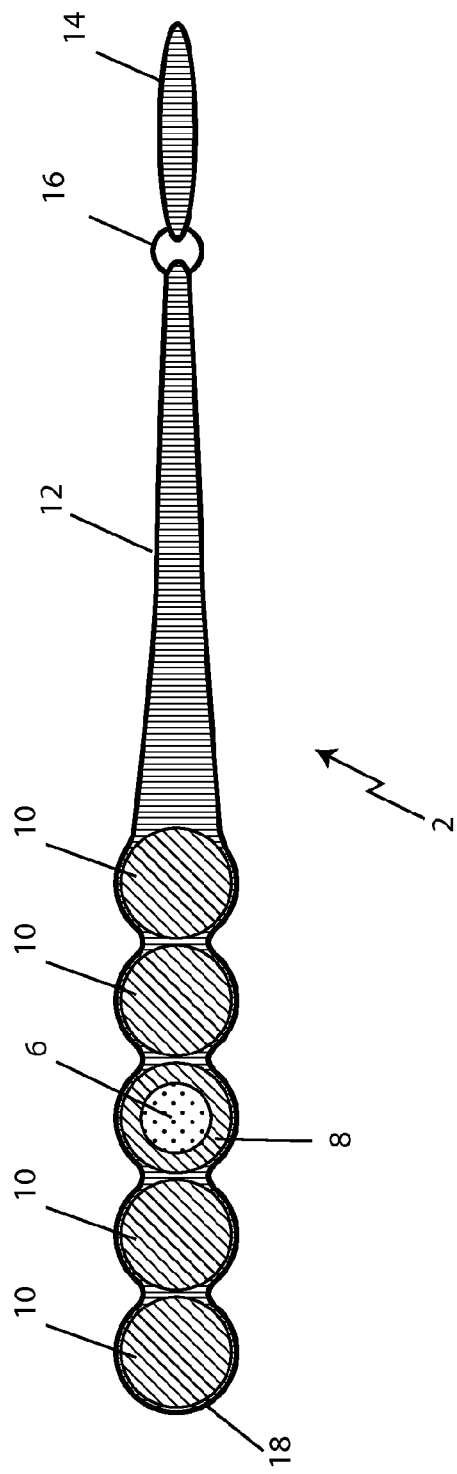

| | | | | |
|---|---|---|---|---|
| 3,700,172 | A * | 10/1972 | Gallegos, Sr. | 239/722 |
| 3,748,867 | A * | 7/1973 | Bel Hamri | 62/271 |
| 3,784,099 | A | 1/1974 | Bosco | |
| 3,899,144 | A | 8/1975 | Werle et al. | |
| 4,092,827 | A * | 6/1978 | Schneider | 60/398 |
| 4,126,850 | A * | 11/1978 | Randolph | 340/983 |
| 4,166,596 | A * | 9/1979 | Mouton et al. | 244/30 |
| 4,486,669 | A * | 12/1984 | Pugh | 290/44 |
| 4,560,107 | A * | 12/1985 | Inculet | 239/3 |
| 4,842,219 | A * | 6/1989 | Jakubowski et al. | 244/31 |
| 4,997,632 | A | 3/1991 | Rodewald | |
| 5,003,186 | A | 3/1991 | Chang et al. | |
| 5,295,625 | A * | 3/1994 | Redford | 239/14.1 |
| 5,322,219 | A | 6/1994 | Esplin | |
| 6,074,722 | A * | 6/2000 | Cuccias | 428/107 |
| 6,422,506 | B1 * | 7/2002 | Colby | 244/1 TD |
| 7,503,681 | B2 * | 3/2009 | Kemp et al. | 362/565 |
| 2008/0203328 | A1 | 8/2008 | Palti | |
| 2008/0265086 | A1 | 10/2008 | Lee | |
| 2009/0255999 | A1 | 10/2009 | Jenkins | |
| 2010/0071771 | A1 | 3/2010 | Chan et al. | |
| 2010/0127224 | A1 | 5/2010 | Neff | |
| 2010/0252648 | A1 * | 10/2010 | Robinson | 239/14.1 |

OTHER PUBLICATIONS

English-language abstract of German Patent No. DE 19518471 A1, European Patent Office, Jul. 18, 1996.

Olmo, F. J., et al., "Pinatubo eruption effects on solar radiation at Almeria (36.83° N, 2.41° W)," Group of Atmospheric Physics, Department of Applied Physics, University of Granada, 18071, Granada, Spain, retrieved from the Internet, URL: http://hera.ugr.es/doi/15024775.pdf, pp. 602-606, Dec. 6, 1994.

Hansen, J., et al., "Pinatubo Climate Investigation," NASA, Goddard Institute for Space Studies, retrieved from the Internet, URL: http://www.giss.nasa.gov/research/briefs/hansen_02/, 1 page, Jan. 1997.

Wolfe, Jason, "Volcanoes and Climate Change," NASA's Distributed Active Archive Centers, retrieved from the Internet, URL: http://earthobservatory.nasa.gov/Features/Volcano/, 3 pages, Sep. 5, 2000.

International Search Report and Written Opinion, PCT Patent Application No. PCT/GB2010/052090, 12 pages, European Patent Office, Apr. 20, 2011.

Search Report issued in connection with United Kingdom Patent Application No. GB0921879.3, 1 page, United Kingdom Intellectual Property Office, Apr. 12, 2010.

Search Report issued in connection with United Kingdom Patent Application No. GB0921879.3, 2 pages, United Kingdom Intellectual Property Office, Aug. 25, 2010 (1 of 2).

Search Report issued in connection with United Kingdom Patent Application No. GB0921879.3, 2 pages, United Kingdom Intellectual Property Office, Aug. 25, 2010 (2 of 2).

Search Report issued in connection with United Kingdom Patent Application No. GB0921879.3, 2 pages, United Kingdom Intellectual Property Office, Aug. 26, 2010.

* cited by examiner

Figure 1: Radiation Scattering by Aerosol Cloud in Lower Stratosphere

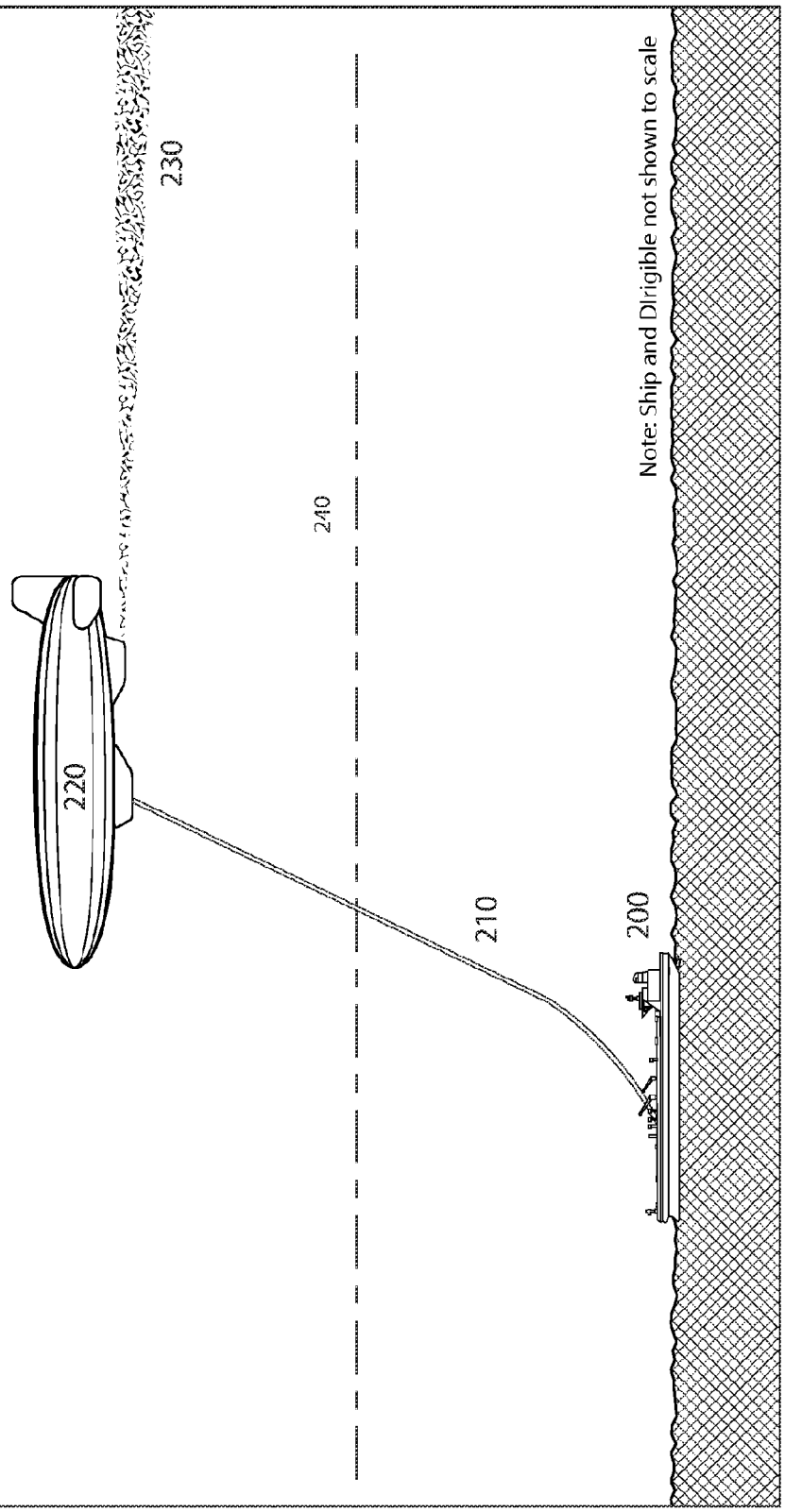

Figure 3: Local Circulation Patterns Induced by Aerosol Cloud

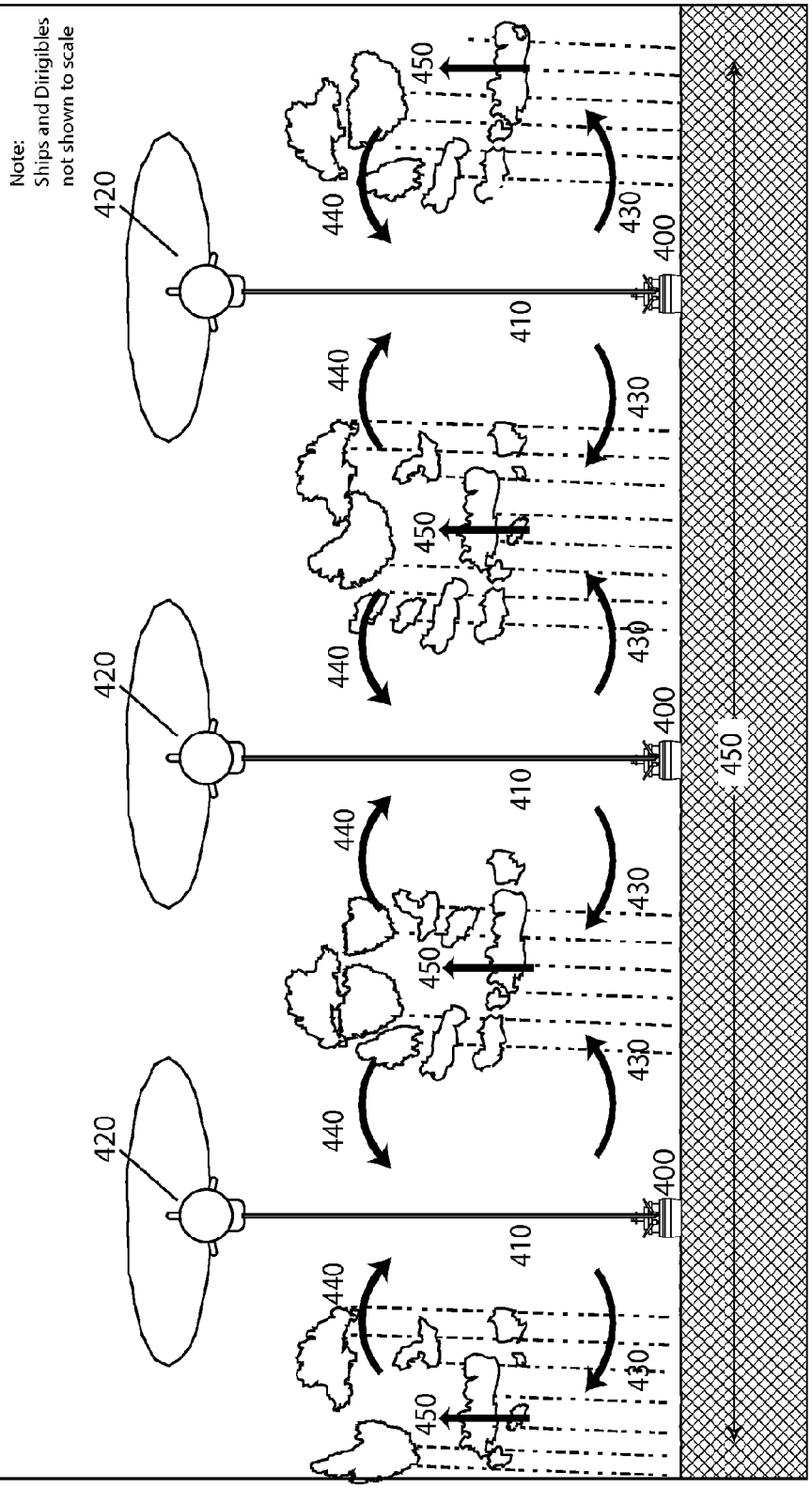

Figure 5: Ensuring a well dispersed aerosol

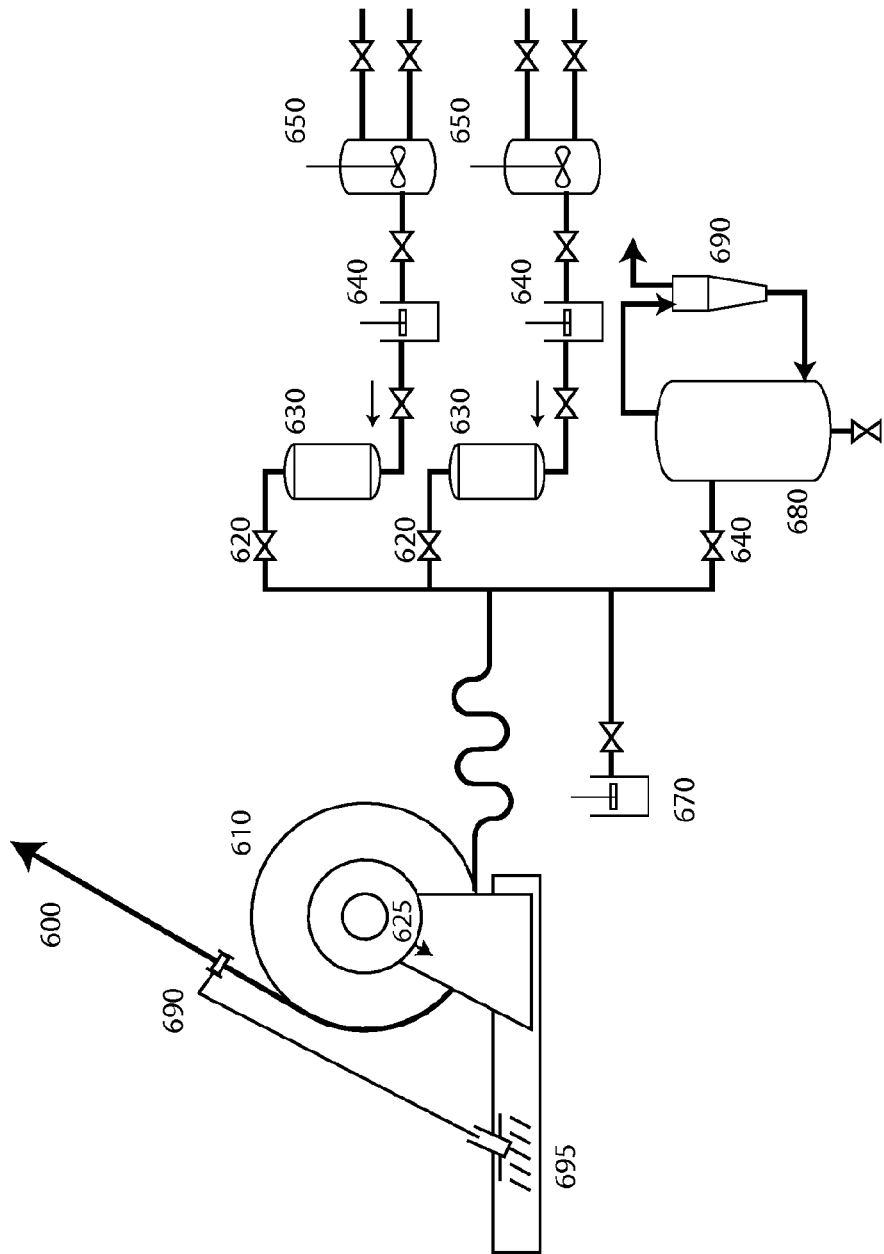

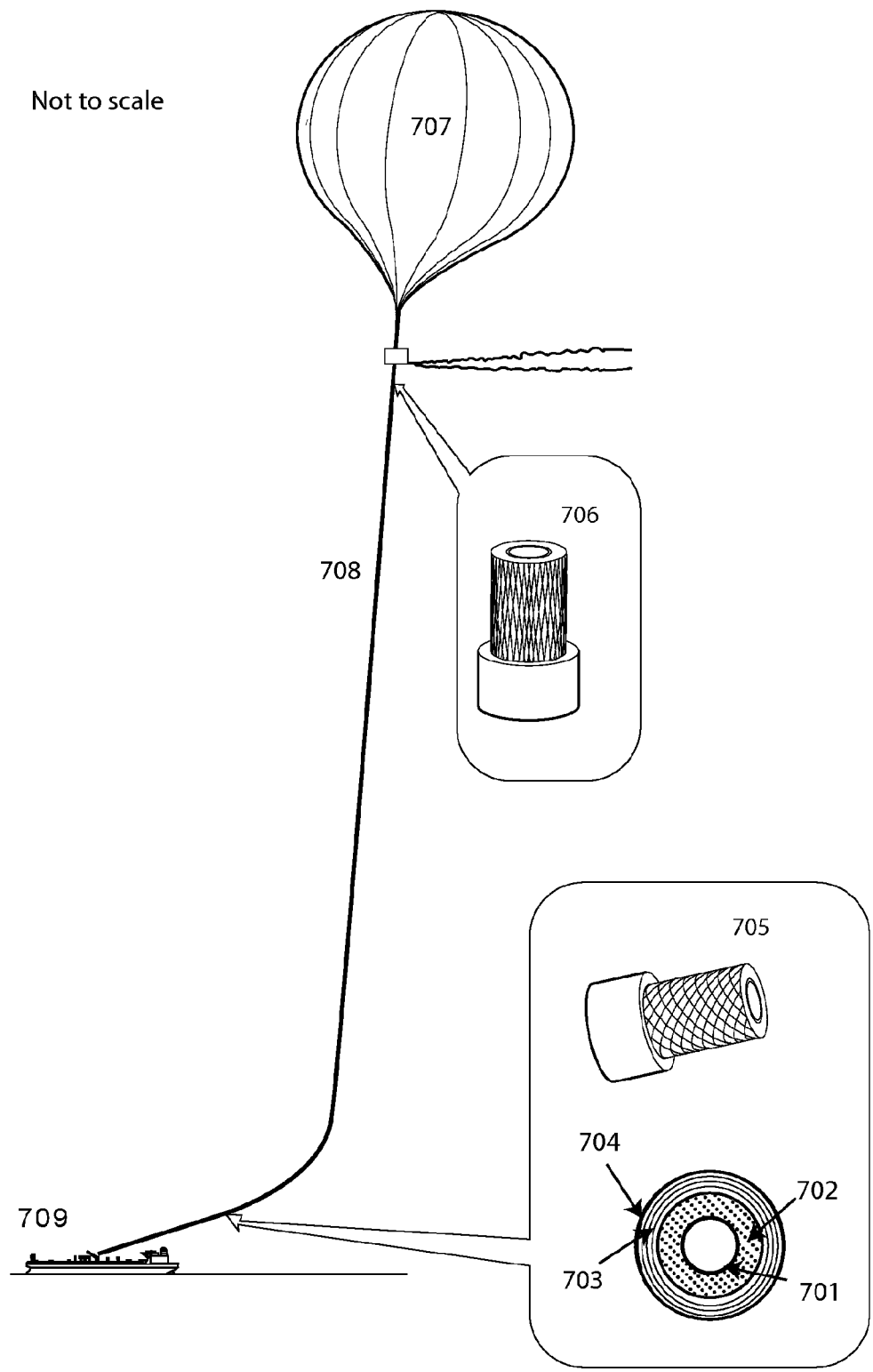
Figure 7: Conduit Construction and Arrangement

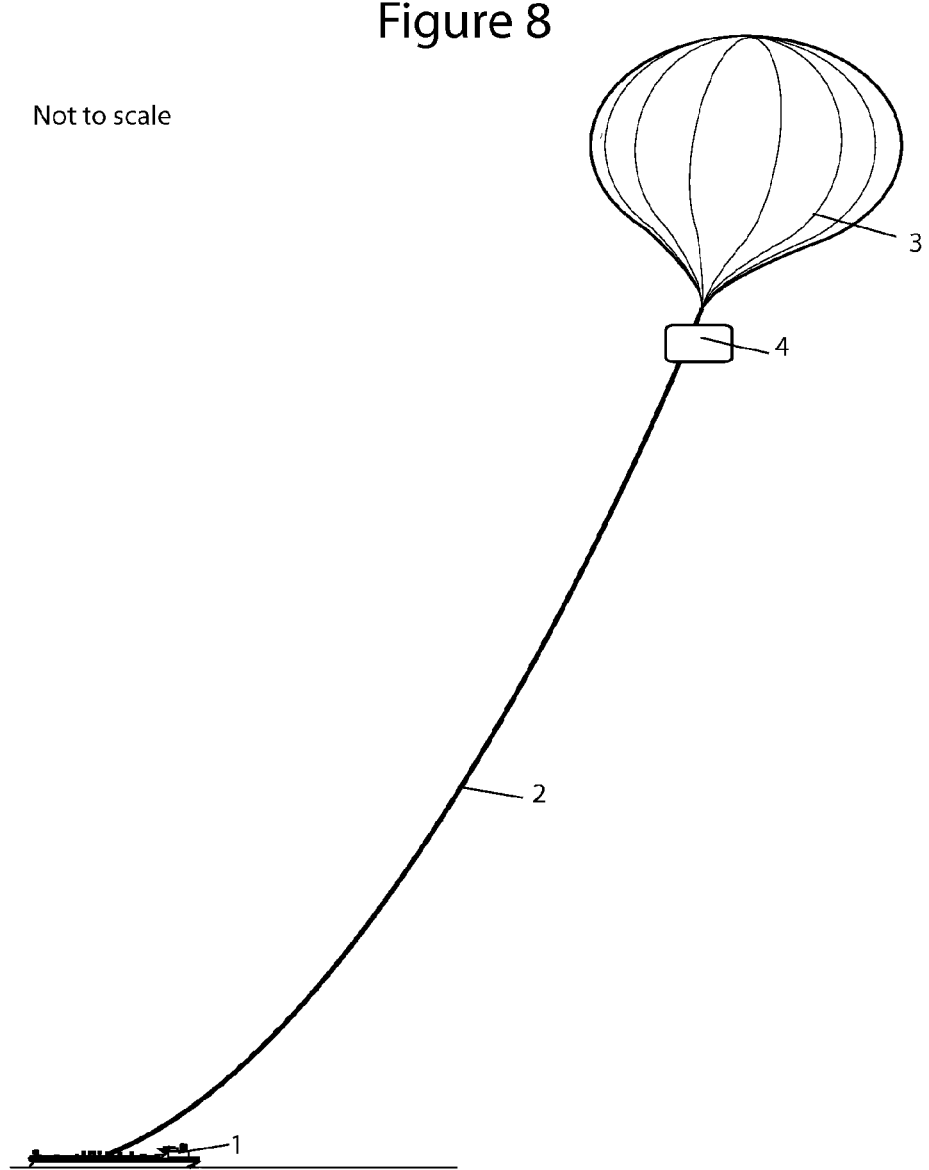

US 9,363,954 B2

ATMOSPHERIC DELIVERY SYSTEM

TECHNICAL FIELD

The present invention relates to an apparatus and method for transporting and dispersing particles into the earth's stratosphere, particularly to achieve a global or local cooling effect.

BACKGROUND TO THE INVENTION

Many authors now agree there is a significant possibility of abrupt discontinuities in the earth's climate, e.g. by global warming, through rising atmospheric greenhouse gas levels which in turn may cause significant positive feedback, such as release of methane from melting arctic tundra or loss of rainforest through changed precipitation patterns. Such discontinuities might lead to a serious impact on ocean levels, and agriculture.

However, emissions of greenhouse gases such as $CO_2$, are intimately connected to the economies of the world. An abrupt reduction in the levels of these gases over effective timescales may be difficult to achieve.

Various methods of reducing the levels of solar radiation incident upon the earth have been proposed, for example, space minors, cloud seeding and stratospheric sulphate aerosols. The effects of significant stratospheric sulphate aerosol injection have been demonstrated to reduce mean global temperatures by around half a degree centigrade over a period of two years with the eruption of Mount Pinatubo in the Philippines in 1991.

Reducing incident solar radiation to counteract the trapping of heat by rising greenhouse gas emissions leaves ocean acidities rising due to increased levels of absorbed carbon dioxide. However it may reduce rising temperatures generating more greenhouse gas emissions through the melting of arctic permafrost exacerbating the ocean acidity problem.

The particular method of stratospheric sulphate aerosols suffers from a number of drawbacks: the choice of particle diameter is determined by natural processes in the stratosphere if precursor materials such as Sulphur Dioxide or Hydrogen Sulphide are used, and the generation of stable aerosols with defined characteristics presents many difficulties. Furthermore their effect on stratospheric chemistry, particularly the ozone concentration may cause concern. In addition the possibility of generating local 'shadows' does not arise since it takes a significant time (days at least) after injection of Sulphur Dioxide for Sulphuric Acid or Ammonium Sulphate particles to be generated by the natural processes (hydration and reaction with UV atmospheric Nitrous Oxides), by which time any high local concentration will be well dispersed by even moderate stratospheric winds.

There is therefore a need for more effective solutions to the problem of global warming with less alarming side effects.

SUMMARY

Apparatuses, clouds, and methods associated with introducing solid particles into the earth's atmosphere are disclosed.

Apparatuses for transporting and dispersing solid particles into the earth's atmosphere may include a conduit connecting a substantially ground level location to an elevated location, a particle transport means, and a deagglomeration means coupled with a dispersal means. The deagglomeration means and dispersal means are located at the elevated location.

Clouds of solid particles located at an elevated location may include at least 1,000 tonnes of solid particles over a region of at least a thousand square kilometers.

Method of transporting solid particles having a refractive index of greater than 1.40 into the earth's atmosphere may include transporting the particles via a conduit from a substantially ground level location to an elevated location and dispersing the particles into the atmosphere.

BRIEF DESCRIPTION OF THE DRAWINGS

FIG. 1 is a diagram showing the effect of a cloud according to the present invention on incoming solar radiation to the earth's surface.

FIG. 2 is a schematic representation of an apparatus according to the present invention.

FIG. 3 is a schematic representation of the effect of a cloud according to the present invention on local weather conditions.

FIG. 4 shows a schematic representation of three apparatuses according to the present invention working together to alter the local weather conditions.

FIG. 5 is a schematic representation of the components of an apparatus according to the present invention located at a stratospheric location.

FIG. 6 is a schematic representation of the components of an apparatus according to the present invention located at a substantially ground-level location.

FIG. 7 is a schematic representation of the conduit construction according to the present invention.

FIG. 8 is a schematic representation of an apparatus according to the invention.

FIG. 9 is a sectional plan view through the cross-section of a tether for use with apparatus according to the present invention.

FIG. 10 is a sectional plan view through the cross-section of another tether for use with apparatus according to the present invention.

FIG. 11 is a perspective view of a section through another tether for use with apparatus according to the present invention.

FIG. 12 is a perspective view of a section through another tether for use with apparatus according to the present invention.

FIG. 13 is a perspective view of a section of another tether for use with apparatus according to the present invention.

FIG. 14 is a perspective view of a section of another tether for use with apparatus according to the present invention.

FIG. 15 is a perspective view of a section of another tether for use with apparatus according to the present invention.

FIG. 16 is a schematic representation of elements of an apparatus according to the present invention.

FIG. 17 is a sectional view through a cross-section of a tether according to the present invention.

FIG. 18 is a schematic representation of a further apparatus according to the present invention.

FIG. 19 is a schematic representation of a light emission means for use with a tether according to the present invention.

DESCRIPTION

In a first aspect, the invention relates to an apparatus for transporting and dispersing solid particles into the earth's atmosphere, comprising a conduit connecting a substantially ground level location to an elevated location, a particle transport means, and a deagglomeration means coupled to a dispersal means, wherein the deagglomeration means and dispersal means are located at the elevated location.

By transporting particles through a conduit into the earth's atmosphere, such particles can be deagglomerated and dispersed to influence the incident solar radiation and provide a local or regional cooling effect. If sufficient quantities of particles are dispersed, then a cloud of such particles can form, providing the local, regional or global cooling effect. Additionally, as the particles are solid their size can be controlled to provide optimum results.

The lifetime of such a cloud is largely determined by the rate of depletion of particles from the cloud.

The exact rate of depletion is influenced by several factors, including particularly the size of the particles. For sub micron particles in the stratosphere, when the settling rates are very low, the losses from the stratosphere to the troposphere are determined by the relatively small amount of mixing between the stratosphere and troposphere. It is estimated that in the region of half of the sub micron particles in the stratosphere may leave the stratosphere per year. In addition, particle-to-particle collision by Brownian motion will cause sub-micron particles to agglomerate and become larger particles, greatly increasing their settling rates.

Thus, in another aspect, the invention relates to a cloud of solid particles located in the earth's atmosphere at an elevated location, wherein the cloud comprises at least 1,000 tonnes (preferably at least 5,000 tonnes, or even at least 10,000 tonnes) of solid particles over a region of at least 1,000 square kilometers, e.g. from 1,000 to 300,000 square kilometers. Such clouds will typically extend over a region of at least 3,000 square kilometers, preferably at least 30,000 square kilometers, e.g. from 50,000 to 300,000 square kilometers.

Depletion rates below the stratosphere will be significantly greater due to the increased turbulence and mixing in the tropopause and the troposphere. Thus, the elevated location is preferably at an altitude of at least 5,000 m, more preferably at least 10,000 m, and most preferably in the stratosphere, in order to minimise particle depletion rates.

For local or regional cooling such a cloud is typified by being able to scatter at least 10% of incident solar radiation, thus providing a local cooling effect.

In one arrangement the cloud may be generated during daylight hours to provide an effective local or regional cooling effect, but disperses over night.

Thus, the invention can provide local shade effects, which, if over a significant body of water can (a) cool the water surface by a few degrees centigrade thereby reducing the motive force of local tropical storms and (b) allow the creation of onshore winds laden with water to promote irrigation of coastal lands.

As discussed, over time the cloud will disperse, and if it was located in the stratosphere, will produce a rarefied cloud without clearly defined boundaries, extending over a significant fraction of the earth's surface. When quantities are sufficient, such a rarefied cloud may only scatter a few percent of incident solar radiation but may provide a global cooling effect.

Thus, in another aspect, the invention relates to a method of influencing the global average level of incident solar radiation, the method comprising releasing at least 100,000 metric tonnes, preferably at least 200,000 metric tonnes, more preferably at least 500,000 metric tonnes of sub micron solid particles within a 12 month period, into the earth's stratosphere.

To maintain such a local or regional cloud in a steady state, emission rates of at least 500 metric tonnes of particles per 12 hours, preferably at least 1000 metric tonnes, more preferably at least 2000 metric tonnes, or more preferably at least 4000 metric tonnes, or most preferably at least 10,000 metric tonnes per 12 hours may be required.

Such throughputs may be provided by a single conduit or by a plurality of conduits. In the case where there is a plurality of conduits, each may be independent of the other or they may be combined into a single apparatus.

Releasing the solid particles into the stratosphere utilising a dispersal means will result in a cone of particles whose cross-section downstream of the injection point is very broad compared to it's vertical span, and from which a cloud according to the invention results. This is because the turbulent intensity in the vertical direction is less than in the horizontal direction in the stratosphere.

In another aspect, the invention relates to an aircraft, e.g. a plane, balloon or other vehicle, located at a stratospheric location, the aircraft comprising a source of solid particles, a deagglomeration means and a dispersal means.

It has been found that particles having a high refractive index, e.g. in excess of 1.40 are able to effectively scatter incoming solar radiation so that less radiation impinges on the earth.

Thus, in another aspect, the invention relates to a method of transporting solid particles having a refractive index of greater than 1.40 into the earth's atmosphere, the method comprising transporting the particles via a conduit from a substantially ground level location to an elevated location and dispersing the particles into the atmosphere.

Preferably the particles have a refractive index of greater than 2.0, more preferably greater than 2.3. Suitable materials include titanium dioxide, sodium chloride, silica and silicon. A highly preferred material is titanium dioxide. However, sodium chloride may be preferred as it can be readily obtained from sea water.

Titanium dioxide exists in several material forms, the primary ones used for scattering being rutile and anatase. All of these forms have refractive indices in excess of 2.4 and so make excellent materials for use in the present invention. Additionally titanium dioxide is stable in air and not toxic. Anatase crystal may be preferred as it has relatively lower abrasion properties than the rutile crystal form.

The refractive index value defined herein refers to the real part of the complex refractive index, often referred to as n, and measured at the wavelength of 500 nm. This component is related to the ability of the material to scatter incident light.

However, the imaginary component, often referred to as k, is also important as it relates to the ability of the material to absorb incident light, and can also be measured at 500 nm.

The ability of a material to scatter incident light is greatly more advantageous than absorbing incident light. Absorption causes the material to heat up which can, in turn, cause heating of the stratosphere which could have a significant influence on weather patterns. Therefore the ratio n/k at 500 nm is preferably greater than 5, more preferably greater than 10, most preferably greater than 50.

In a preferred embodiment the present invention involves the Mie scattering of incident solar radiation. Mie scattering occurs when the size of the particles is comparable with that of the wavelength of incident light and preferably with the particle diameter being within a factor of 10, more preferably a factor of 3, of the wavelength of the incident light.

Thus, the particles are typically sub-micron and preferably the particles have a mean particle size in the range of from 0.01 to 1.3 μm, more preferably in the range of from 0.02 to 0.5 μm. This size range straddles the ultra violet and visible regions of the electromagnetic spectrum and therefore will be effective at scattering these dominant regions of the incident solar radiation.

In a particularly preferred embodiment, the particles may have a bimodal size distribution with peaks in the visible and ultra violet wavelengths respectively. For example peaks at from 0.1 to 0.3 μm and at from 0.02 to 0.06 μm are particularly effective, particularly if UV scattering is desirable to reduce ground based exposure to UV.

At such small particle sizes, agglomeration of the particles presents a significant difficulty. For titanium dioxide the inter-particle forces are particularly high because of the high polarisability of oxygen in the particles. Agglomeration will inhibit the ability of the particles to be involved in Mie scattering of the incident radiation due to the increase in effective particle size that results from agglomeration. It is therefore highly desirable to be able to deagglomerate the particles at the stratospheric location.

In a preferred embodiment, the solid particles are coated with one or more materials, different to the material of the particles.

Coatings can be selected from a range of options, for example to reduce chlorine concentrations present in the stratosphere, to reduce the tendency of ice, nitrogen oxides or other polar molecules to coat the surface, to reduce ozone depletion, and promote ozone generation in the stratosphere, or to mitigate the possibility of electrical discharge near the dispersal means. For example, alkaline (metal and earth) coatings involving oxides, hydroxides, aluminates, silicas and combinations thereof can be used to scavenge chlorine from the stratosphere, thus preventing it from destroying ozone.

The presence of hydroxyl groups on the surface of the particles can increase their tendency to absorb incident light, which is undesirable, as discussed above. Therefore it may be beneficial to take steps to prevent the occurrence of hydroxyl groups. For example, the particles can be pre-treated by the use of very dry nitrogen or air at elevated temperatures of greater than 250° C. or greater than 300° C. Another possibility is to apply a chemical treatment which reacts with adsorbed hydroxyl groups, e.g. the use of octyl chlorosiloxanes.

Thus, the particulates, particularly titanium dioxide, which have been prepared by drying or chemical reaction or a combination thereof, to have a solar radiation absorption of at least 90% less than that produced by an equivalent weight of water with the same particle size distribution as the particulates and at wavelengths of about 2 microns by removal of sufficient absorbed water, hydroxyl groups or polar molecules, are desirable.

Hydrophobic coatings can also be chosen to reduce the tendency for water vapour to absorb or condense on the particles and form ice. Ice can have a highly deleterious effect on the destruction of ozone, particularly in the polar regions. In a preferred embodiment, the coatings comprise sulphate groups, phosphate groups, silanes and siloxanes or a variety of other hydrophobic coatings.

It is also possible to use a coating material to produce either a positive or a negative charge on each particle, leading to mutual repulsion of likely charged particles and reduced agglomeration.

Transporting particles through a conduit to the stratosphere presents a number of engineering challenges. However, delivery of particles into the stratosphere is believed to be particularly beneficial due to the poor mixing in the region, particularly with the troposphere below, allowing the particles to remain suspended in the stratosphere for extended periods of time.

The particles can be transported through the conduit in a number of different ways. For example, the particle transport means could comprise a pneumatic conveying arrangement, wherein containers carrying the particles are conveyed up a conduit to the stratospheric location with the return of emptied containers down a second conduit.

However, preferably the particles are dispersed in a fluid carrier material so that the carrier and particles can be pumped through the conduit in which case the particle transport means comprises a fluid pressurisation means.

Preferably, the carrier fluid is a supercritical fluid or a liquid, to enable the fluid to carry a greater density of particles per unit volume and consequently require a narrower bore of conduit. In a particularly preferred embodiment the particles are present as a slurry in a carrier fluid, at a concentration of from 5 to 50% by volume, more preferably from 10 to 30% by volume, e.g. about 15%.

Carrier fluid temperatures of from −80 to 150° C., preferably from −60 to 100° C. are beneficial. Preferred carrier fluids are nitrogen, air, mixtures of nitrogen-rich oxygen streams or water. Most preferred are nitrogen or nitrogen-rich oxygen streams. The carrier fluid pH and composition may be adjusted e.g. to enhance the surface properties of the carried particles, to protect the conduit or to facilitate dispersion at altitude.

It is also preferably for the carrier fluid to be essentially dry as introduction of water, particularly into the stratosphere, can be undesirable as water tends to absorb a wide range of incident light, thus potentially warming the stratosphere. Ideally, the carrier fluid introduces so little water that the resulting OH absorption is increased by less than 1% of that already present in the atmosphere where the particles are dispersed. For example it could contain less than 100 ppm water, more preferably less than 10 ppm water.

In order for a carrier fluid to flow along such a long length of conduit and against gravity, it must be raised to a very high pressure at the entry to the conduit. Pressures at the base of the conduit in excess of 100 MPa, preferably in excess of 200 MPa, more preferably in excess of 400 MPa and even in excess of 600 MPa might be necessary to achieve acceptable flow rates in the conduit. In order to achieve such high pressures, the supply of carrier fluid may be via a plurality of pressure vessels.

At such elevated temperatures and pressures the carrier fluid will become a supercritical fluid, which may be desirable, e.g. avoiding the need to de-water the slurry at altitude, for supplying power to the deagglomeration means and/or the dispersal means, as discussed below.

Liquid or supercritical fluid average flow velocities of from 1 to 20 m/s can provide an acceptable balance between keeping the conduit size to a minimum whilst maintaining pressure drop and conduit abrasion during flow to acceptable levels.

As the weight of the conduit added to the weight of the particles and any carrier material must be supported, the conduit is preferably at least 5000 m long, more preferably at least 10,000 m long, most preferably from 10,000 to 25,000 m long to enable it to reach the stratosphere, without being excessively long. Alternatively, it could be from 10,000 to 27,000 m long. The weight of the particles and carrier fluid may be partially or fully supported by the pressure provided at the entry to the conduit. The frictional pressure drop may also fully or partially support the weight of the conduit, thereby reducing the support load for the conduit.

Additionally, the conduit desirably has a cross-sectional area great enough to allow the flow of a fluid without an unworkable pressure drops but yet not so great that transverse wind loading present structural problems. Thus, the conduit preferably has an internal diameter of from 1.0 to 30 cm, more preferably from 2.0 to 10.0 cm.

The conduit may be made from a wide range of materials, but strong and light materials are preferred such as high strength carbon fibre, an aramid fibre or liquid crystal polymer such as Kevlar™, Technora™, Vectran™ or Twaron™ and ultra-high molecular weight polyethylenes such as Spectra™ and Dyneema™ or PBO's such as Zylon™. The choice depends particularly on strength, conductivity, operating temperature and abrasion and corrosion resistance. For example, it may be necessary to ensure that the conduit is not conducting, to avoid problems associated with lightning strikes. As particles may be flowing through the conduit, the internal wall of the conduit may be coated with an abrasion-resistant material such as titanium carbide and the like.

The conduit must be designed to withstand extreme pressures, giving rise to very high hoop stresses and longitudinal stresses. It has been observed that the hoop stress at the base of the conduit will be far in excess of the hoop stress at the top of the conduit due to the drop in fluid pressure as it flows upwards through the conduit. In contrast, the longitudinal tensile stresses will be much greater at the top of the conduit than at the base because more weight of the conduit is supported at the top than at the bottom. Thus the nature of the stresses can vary along the length of the conduit.

Thus, preferably the conduit comprises reinforcing elongate fibrous material, the fibrous material being braided or wound at an angle to the central axis of the conduit, wherein the angle of winding is greater at one end of the conduit than at the other. The angle of winding can therefore be adjusted along the length of the conduit to account for the change in the nature of the stress encountered. This results in less material being required, reducing the size and cost of the conduit and supporting dirigible or balloon.

Thus, the end having the greater angle of winding or supply is typically at the substantially ground-level location. This provides greater support for the high hoop stress at the base, whist dealing with the high longitudinal tension forces at the top end.

In a preferred embodiment, the change in angle of winding or supply is gradual or occurs in a plurality of step changes. For example, the greater angle of winding or supply can be from 30 to 80°, preferably from 35 to 60°, to a line parallel to the axis of the conduit and the lesser angle of winding can be less than 30° to a line parallel to the axis of the conduit.

Once at the elevated location the particles, usually together with their carrier fluid such as nitrogen, are typically dispersed into the atmosphere by the dispersal means. Suitable dispersal means involves transporting the particles into a high velocity air stream and may be provided by a jet engine or one or more fans.

One difficulty with the operation of the dispersal means is providing power to drive it at the stratospheric location. In one embodiment, power is provided by providing electrical power or fuel lines along the conduit.

In another embodiment, fuel gases such as hydrogen and methane can be included in the carrier fluid for the particles. With an appropriate degassing stage, the fuel gases can be extracted for use at the stratospheric location.

In a preferred embodiment, the apparatus comprises a letdown facility at the stratospheric location, such as a turbine. Such a turbine can then provide power to the dispersal means and/or the deagglomeration means.

The deagglomeration means preferably comprises a microniser, a venturi nozzle or a combination thereof. Use of a single or a plurality of micronisers is possible. Such micronisers are preferably used in combination with a supercritical fluid, as described above. This can involve expansion through grinding jets. A suitable dimension for the microniser is in the region of 0.2-4 m in diameter. In a preferred embodiment the deagglomeration means includes a jet impact mill, preferably before the particles pass to a microniser.

Once the particles have been deagglomerated they are then dispersed into the stratosphere by the dispersal means. As the particles will typically tend to reagglomerate very rapidly, it is preferred that the dispersal means is close-coupled to the deagglomeration means. For example, the exit from the deagglomeration means can be directly in any gas flow generated by the dispersal means.

The dispersal means should encourage the rapid mixing of large quantities of diluent air to increase the distance between individual particles to reduce the chance of the particles colliding and reagglomerating and to prevent the cloud from sinking by too great an extent. Such systems typically include one or more nozzles situated in a fast flowing air stream provided by a combination of the motion of the apparatus, e.g. a fan or jet engine exhaust and/or ejection arrangements provided by the expansion of any carrier fluid vapour.

The apparatus desirably includes a balloon, dirigible, or airship, coupled to the conduit at the stratospheric location. Such a dirigible may be required to support the entire weight of the conduit and its contents, together with any associated equipment.

Such a balloon or dirigible is therefore preferably capable of providing a lifting force of at least 40 metric tonnes, more preferably at least 100 metric tonnes, and most preferably at least 200 metric tonnes. Large versions for providing a local shade effect might be as much as 2500 metric tonnes. Such lift values can be achieved with a balloon diameter of between 50 and 300 m, or alternatively with a dirigible comprising a lighter-than-air chamber with a length of 600 m and a width of 130 m, for example.

The conduit may be equipped with a parachute means to allow release of the conduit from the balloon or dirigible and a more gradual descent of the conduit.

Wind speeds in the stratosphere are generally much lower than those reached in the troposphere. The balloon or dirigible may therefore be located at a higher altitude than the elevated location to allow it to sit in relatively quiet air. For example, the elevated location could be below the stratosphere whilst the balloon or dirigible sits in the stratosphere.

In a preferred embodiment, the balloon or dirigible is capable of altering its altitude to alter the effective length of the conduit by altering the altitude of the conduit exit. For example, the dirigible preferably comprises a spool for the conduit to coil onto. Such a spool would need to be large enough to prevent stresses on the conduit wall becoming excessive due to coiling yet not so large that it becomes impractical. Thus a spool with a diameter of from 2 to 40 m is suitable, preferably from 5 to 20 m in diameter.

The spool may have an electric motor driven winding arrangement both to coil the conduit and to provide active damping of significant conduit oscillations.

Such a balloon or dirigible may conveniently be used to install the conduit in position. Thus, in another aspect, the invention relates to a method of installing a conduit connecting a substantially ground-level location to an elevated location at an altitude of at least 10,000 m, the method comprising fixing one end of the conduit to the substantially ground-level location and coiling the conduit on a spool coupled to a balloon or dirigible, followed by increasing the altitude of the dirigible to thereby unravel the conduit until the conduit reaches the elevated location.

The apparatus according to the present invention may also comprise an active damping control means, to reduce any unwanted oscillating in the conduit.

The substantially ground-level location is typically at or very near to the land or sea surface of the planet e.g. within 1,000 m, preferably within 100 m of a land or sea surface. In one preferred embodiment, the apparatus comprises a ship, to which is coupled to the base of the conduit. A spool, with or without active damping means may also be provided on the ship. In one possible mode of operation, a plurality of ships may be employed, each with their own conduit and associated equipment. In this way, either one large cloud or a plurality of smaller clouds can be generated.

FIG. 1 shows a diagram of the effect of a cloud 100 according to the present invention located in the earth's stratosphere. The cloud 100 comprises titanium dioxide having a unimodal distribution with a peak at 0.25 micrometers particle diameter or a bimodal particle size distribution with peaks at 0.15 micrometers particle diameter and at 0.04 micrometers particle diameter.

Incoming solar radiation 102 impinges upon the cloud 100. Due to the particle size of the titanium dioxide particles in the cloud, Mie scattering of the incoming solar radiation occurs causing a proportion of the incoming solar radiation 102 to be reflected away from the earth as scattered radiation 104. Thus, a significant proportion of the ultra violet, visible and infra red light of the incoming solar radiation 102 is prevented from reaching the earth's surface. A reduced level of solar radiation 106 passes through the cloud to impinge upon the earth's surface.

Infrared radiation 108 is emitted from the earth's surface, which largely passes through the cloud 100 without being scattered due to the wavelength of the infrared radiation being very significantly greater than the particle size of the titanium dioxide particles. Thus, the cloud 100 according to the present invention is able to reduce the level of incoming solar radiation without significantly inhibiting the emission of infrared radiation to space, and thus is able to cause a local or regional cooling effect.

FIG. 2 shows an apparatus according to the present invention comprising a conduit 210 connecting a substantially ground-level location on a ship 200 to a stratospheric location at a dirigible 220. Dirigible 220 comprises a deagglomeration means (not shown) and a dispersal means (not shown). Also shown is the tropopause 240, signifying the boundary between the troposphere below and stratosphere above.

In use, particles typically of sub-micron high refractive index particles, such as titanium dioxide, are transported from the ship 200 by means of a particle transport means, such as a pressurisation of a carrier fluid, so that the particles travel along the conduit 210 to the stratospheric location 220. As the particles of the titanium dioxide are sub-micron, some agglomeration will have occurred during transport through the conduit, and so the particles are passed through a deagglomeration means (not shown) before passing to dispersal means (not shown) such as a fan or jet engine. Once the particles have passed through dispersal means, they begin to form a cloud 230 according to the present invention.

FIG. 3 shows a schematic representation of how local weather patterns may be influenced by the action of a cloud 360 according to the present invention. Incoming solar radiation 370 is scattered by cloud 360, as discussed above, resulting in a region of cooled water surface 300 in the shadow of the cloud 360. The cooled water surface 300 has the effect of cooling the air above it, which has the effect of inducing a down draught of air 310 which is cooler and therefore denser than adjacent air. The down draught 310 causes an increase in horizontal wind speed at the water surface 320 which has the effect of increasing the water vapour uptake of the air 320 and cooling the water surface, before rising. The rising air column 330 results in the formation of clouds and ultimately precipitation. Rising air 330 is drawn back into the cloud's shadow by moving horizontally 340 and it begins its descent once more.

The formation of the clouds has the effect of further reducing incident radiation to extend the region of cooled water surface 300 to an extended cooled water region 380.

Thus, it can be seen that a cloud according to the present invention can be employed to cool the water surface by a few degrees and allow the creation of onshore winds laden with water to promote irrigation of coastal lands.

FIG. 4 shows the effect of using three apparatuses according to the present invention together to generate a more substantial cooling effect. In this embodiment, three ships 400 each with their own conduit 410 attached to dirigible 420 are employed. Three separate clouds of high refractive index particles are generated, having the effect of cooling an extended region of water surface 460.

In the embodiment shown, a significant spacing is left between the clouds, so that circulation patterns between the clouds are generated. Thus, cooled water causes a cooling of the air above resulting in descending air 440 and horizontal wind 430 picking up additional water vapour. Airstreams 430 rise 450 and form clouds and eventually precipitation to subsequently be drawn back into air stream 440. However, it can be advantageous to have multiple sources without a significant spacing.

FIG. 5 shows in more detail suitable equipment of an apparatus according to the present invention located at a stratospheric location, some of which may alternatively be a component of an aircraft according to the present invention. The equipment comprises the upper end of conduit 500 wound around spool 510 which is driven electrically by motor 526 with active damping control to dampen oscillating in the conduit 500, and connected to a pipeline via rotational seal 520. The particles in the conduit are carried by a supercritical nitrogen carrier and remain in a supercritical state at the stratospheric location, despite the loss in pressure head and frictional pressure drop during transport from a substantially ground-level location (not shown). The particles carried in this super critical water pass through a let-down facility 530, which may be a turbine and/or reducing valve, to flash-off nitrogen and bring the carrier fluid out of a supercritical state.

The particles, now carried in a largely gaseous carrier are then passed to a jet impact mill and microniser 540 via multiple entry points to a microniser of approximately 4 meters in diameter. The jet impact mill and microniser, constituting a deagglomeration means, breaks any agglomerates formed between the particles and ejects the individual particles via nozzle or nozzles 570. Also shown is a fan or jet engine 560 with air inlet 550. The fan or jet engine 560, constituting a dispersal means, generates a significant flow of air. As can be seen, nozzle 570 is located in the flowing gas stream, and the agglomeration means is therefore close-coupled to the dispersal means. This has the effect that the deagglomerated particles do not have an opportunity to reagglomerate and are dispersed into the stratosphere to form a cloud 580 according to the present invention. The particle stream can also be injected into the inlet of the jet, fan or gas turbine to aid dispension but can lead to particle build-up and particle degradation issues. Also shown is valve 525 which can be opened to allow the ingress of air when it is desired to drain the contents of the conduit 500.

FIG. 6 shows in more detail suitable equipment of an apparatus according to the present invention located at a substantially ground-level location. Shown is a portion of a slurry pipeline or conduit 600 attached to a spool 610 to take the tension force from the slurry pipeline 600. The spool 610 has active tensioning arrangements 625 to control pipeline oscillations. The pipeline 600 is secured by a pipe release restraint 690 which is secured by an anchor 695 to a ship or to the ground.

Also shown is suitable slurry preparation equipment. Separate streams of high refractive index particles and carrier fluid, e.g. nitrogen, are passed to slurry mixing vessels 650. Once mixed, the mixture is passed to pumps 640 which increase the pressure of the mixture to very high levels. Once at high pressure, the mixture is passed to pressure surge vessels 630 in order to smooth out any pressure impulses from pumps 640. As shown, a plurality of streams are employed and combined together to increase the pressure of the slurry still further before being passed to pipeline 600 for transmission to the stratosphere.

Additionally, additives may be included via additive feed pump 670 and a pipe dump tank 680 is conveniently to allow draining of the conduit when the dirigible needs to move location independently of the ground location. Typically, heating apparatus (not shown) may also be employed in order for the carrier fluid to become a supercritical fluid.

FIG. 7 shows in more detail the conduit construction and arrangement of its structure. Shown is a former 701, surrounded by a composite pipe 702, insulation 703 and surface protection 704. Fluid is pumped from a ship or ground station 709 via the conduit 708 to a dispersal arrangement 710 at an elevated location.

The former 701 is typically steel but can be a strong non-conducting abrasion-resistant plastic, typically from 0.2 to 2.0 mm thick, providing abrasion resistance and abase on which fibre is wound on or which a braid is stretched. An epoxy or other filler would provide some additional stability to the fibre orientation.

Close-up view 706 illustrates how the elongate fibres or braid are wound around the conduit at a very low angle with respect to a line passing through the fibre and parallel to the central axis. This helps to deal with the very high longitudinal tension forces encountered there due to the weight of the conduit being supported. At the base of the conduit in close-up view 705, it can be seen that the elongate fibres or braid are wound around the conduit at a greater angle with respect to a line passing through the fibre and parallel to the central axis. This is to provide greater protection for the high hoop stress encountered there due to the high fluid pressure. Although not shown, the angle of winding or braid alters gradually from the top to the bottom to account for the gradually changing nature of the stresses in the conduit. This provides for an efficient use of materials, reducing the size and cost of the conduit.

The following relates to high altitude platforms, particularly for delivering information services at altitude, including telecommunications, observation and positioning services.

High altitude platforms, e.g. situated from 10 to 25 km altitude, have been proposed for a wide variety of applications. One area of growing interest is in providing information services from such arrangements such as telecommunications, positioning and observation capabilities including high speed internet, e-mail, telephony, televisual services, video-on-demand, global positioning.

Compared with satellites, high altitude platforms have several advantages, primarily because the distance from a transmitter to a receiver on Earth can be much less, with geostationary satellites typically at 40,000 km altitude and around 1000 km altitude for a low Earth orbit satellite.

This relative nearness of high altitude platforms can result in much stronger signals and avoid the expense of rocket launches as well as providing shorter development times.

U.S. Pat. No. 7,046,934 discloses a high altitude balloon for delivering information services in conjunction with a satellite.

However, there are numerous and significant technical challenges to providing a reliable commercial information service from a high altitude platform. A key problem is maintaining the stability of such a platform, which will be subject to winds which can be highly fluctuating and of very high speeds. In particular, many information services require accurate directional transmissions which are difficult to deliver from a platform subject to the high winds present at such altitudes.

Furthermore the power available locally at altitude is generally restricted to a few kW, ruling out engineering solutions involving high powered devices.

Therefore, further improvements in this area would be highly desirable.

In another aspect, the invention relates to an apparatus for generating electrical energy at altitude, comprising a tether connecting a substantially ground level location to a platform at an elevated location, the tether comprising a conduit coupled to an electrical generator at the platform, the conduit arranged to allow the flow of a fuel fluid from the substantially ground level location to the elevated location, and the electrical generator being operable to convert energy in the fuel fluid to electrical energy at the elevated location.

It has been found that providing a high altitude platform which can generate electrical power from a fuel fluid can allow for orders of magnitude more power available than that available from in situ generation such as solar generators or fuel cells which extract their fuel from the atmosphere.

With large quantities of power available at altitude, options for solving a variety of technical hurdles related to such platforms become available, which were not previously possible.

The engineering challenges involved in such an arrangement are significant. However, with careful design of the apparatus it can be achieved, as will be discussed below.

Typically the elevated location will be at an altitude of from 5,000 m to 30,000 m, preferably from 10,000 m to 25,000 m, more preferably from 15,000 m to 25,000 m. This provides sufficient altitude to deliver information services over a wide area whilst not being so high as to present insurmountable engineering challenges. In a preferred embodiment, the elevated location is in the stratosphere, preferably just above or at the tropopause, where side winds are much less severe.

The substantially ground-level location is typically at or very near to the land or sea surface of Earth, e.g. within 1000 m, preferably within 100 m of a land or sea surface. In one preferred embodiment, the apparatus comprises a ship to which is coupled the tether.

In a preferred embodiment the apparatus comprises one or more balloons or dirigibles at the elevated location, to provide the lift necessary to keep the apparatus at the elevated location. Such a one or more balloon or dirigible is therefore preferably capable of providing a lifting force of at least 5.0 metric tonnes, more preferably at least 10.0 metric tonnes, and possibly at least 25 metric tonnes.

In order to provide such lift, any balloons preferably have a total volume of from 60,000 m³ to 2,000,000 m³.

Such a balloon or dirigible can be spherical but is preferably non-spherical or ellipsoidal in shape. This provides a more aerodynamic shape, which helps reduce wind forces.

The conduit is typically a pipe with a circular or near-circular cross-section, through which the fuel fluid flows.

Accordingly, the inside diameter, through which the fuel fluid flows, is preferably from 1.5 to 30 mm. This is sufficient to allow for practical flow rates of from 0.00005 to 3.0 kg/s, preferably from 0.00015 to 1.0 kg/s of fuel fluid.

In order for the fuel fluid to flow during such a long length of conduit, and against gravity, it must be raised to a high pressure at the entry to the conduit. Pressures in excess of 100 MPa, preferably in excess of 200 MPa, more preferably in excess of 400 MPa and even in excess of 600 MPa may be necessary to achieve acceptable flow rates in the conduit. However, if the fuel fluid is hydrogen then lower pressures are required, with pressures of from 1 to 100 MPa being appropriate. In order to achieve such high pressures the fuel fluid may be provided via a plurality of pressure vessels.

The fuel fluid preferably comprises hydrogen and/or a hydrocarbon fluid. Due to the high pressures necessary for transporting the fluid through the conduit, preferably the hydrocarbon fluid has an average molecular weight of less than 200, preferably less than 150, more preferably less than 100, most preferably less than 50 or even less than 20. In one preferred embodiment, the fuel fluid comprises at least 90 wt %, more preferably at least 99 wt %, most preferably at least 99.9 wt % hydrogen, or even at least 99.99 wt % hydrogen.

In one preferred embodiment the electrical generator comprises a combustion engine, generating electricity by combustion of the fuel fluid, e.g. with air taken from altitude. In another preferred embodiment, the electrical generator comprises a fuel cell, which can consume hydrogen, as the fuel fluid, generating electricity by reaction of hydrogen and air compressed and possibly dehumidified from air at altitude.

The generator is typically capable of generating a few kW up to a few MW. Thus, preferably the generator can produce from 3 to 60,000 kW, more preferably from 100 to 20,000 kW of electrical power.

The conduit may be made from a wide range of materials, but strong and light materials are preferred such as high strength carbon fibre, or aramid fibre such as Kevlar™, Technora™, Vectran™ or Thoron™ and ultra-high molecular weight polyethylenes such as Spectra™ and Dyneema™ or PBO's such as Zylon™.

For hydrogen conveying, the conduit may comprise a composite pipe with a liner, such as metal or PTFE or other low permeabilty plastics, to carry the fuel fluid. This combination prevents diffusion of hydrogen and hydrogen loss.

The tether may comprise one or more reinforcing cables which travel along the outside of the conduit to provide strength. Thus the tether functions to bear the tensions necessary to support the apparatus, whilst the conduit functions to transport the fuel fluid, although it may also carry some tension.

It has been further discovered that such a tether may preferably have a non-circular cross-section to reduce horizontal drag whilst maintaining vertical strength and pressure containment for the conduit.

Horizontal drag on the tether is a significant problem as it could cause the tether to move to a more horizontal orientation, thus lowering the altitude of the platform to below that of the desired elevated location, a problem that can be described as blow-over. This can be exacerbated if the platform enters a region of higher wind speeds which could lead to a catastrophic failure due to excess wind loads.

Thus, in another aspect, the invention relates to an apparatus for providing high altitude services, comprising a platform at an elevated location, the platform being tethered to a substantially ground level location, wherein the tether has a non-circular cross-section.

Such a tether can be characterised by the aspect ratio of the cross-section, i.e. the ratio of the length of sides of a rectangle which just contains the cross-section. Aspect ratios of from 1.5 to 20.0 are preferred.

As discussed above, the tether may comprise reinforcing cables so as to provide sufficient strength to the tether. In one preferred embodiment, the tether comprises more than one cable, each being parallel to each other. In this way cables with a circular cross-section can produce a tether according to the invention having a non-circular cross-section. Further cables can be included which may also be aligned with the other cables to produce an elongate cross-sectional tether. For example a tether comprising from 1 to 10 cables is preferred.

As is well-known in the art, a circular cross-section tether would always present the same area to the air irrespective of any twisting action in the tether. However a tether with a non-circular cross-section has the potential to expose a variable area to the flowing air according to the rotated state of the tether.

However, one problem with long non-circular cross-section tethers is that they tend to expose their maximum area to flowing air, rather than expose their minimum area. This is because such tethers will generally have a low torsional stiffness and align themselves in the flowing air with the minimum strain energy thereby putting the long axis at right angles to the flow direction unless regularly oriented by, for example, vanes.

Thus, their natural tendency to present an increased area can increase the forces on the tether due to flowing air. It is therefore desirable to take steps to ensure that the non-circular cross-section tether tends to expose a minimum area to flowing air.

It has now been surprisingly found that such non-circular cross-section tethers can be made to expose their minimum area to flowing air even though they may have low torsional stiffness.

Such tethers are thus typically elongate in their cross-section, having two well-defined ends to the elongate cross-section. The two ends can be referred to as the leading edge and trailing edge respectively. The leading edge is typically rounded and is intended to be at the most upstream point of air flowing over the tether. Likewise the trailing edge is intended to be the most downstream point of flowing air. The distance from the most upstream point of the tether to the most downstream point on the tether in a given cross-section, is referred to as the chord length of the tether at that cross-section.

When air flows over such a tether, it creates forces on the tether. At any given time there is a notional point within the cross-section of the tether about which the sum of all the moments induced by such forces, cancel each other out. Such a point is referred to herein as the centre of aerodynamic pressure.

Because of the length of the tether it will generally have a low torsional stiffness. It has been surprisingly found that if the centre of mass of the tether at a given cross-section is nearer to the leading edge of the tether than is the centre of aerodynamic pressure, then the tether will find its most stable arrangement to be when it exposes its minimum area to the flowing air, even though the stored strain energy may not be a minimum.

In other words, the centre of mass is preferably nearer to the leading edge than is the centre of aerodynamic pressure in use.

It is typically the case that for an elongate cross-section of tether positioned to expose its minimum area to the flowing air, the centre of aerodynamic pressure will be near to one-quarter the chord length from the leading edge. Thus, in order to ensure that the centre of mass is closer to the leading edge than is the centre of aerodynamic pressure, particular steps need to be taken.

For example, the shape of the tether cross-section is preferably a tear-drop shape, e.g. similar to a helicopter rotor cross-section. However, this alone will not ensure that the centre of mass is sufficiently close to the leading edge. Thus, typically the material density of the tether is greater near to the leading edge than it is in the centre and near to the trailing edge.

Such variation in material density may be gradual or sudden. It may even involve dislocations where other materials, such as optical fibre cables and reinforcing cables, pass through the tether. However, any variation in material density together with variations in shape together provide the centre of mass being suitably positioned within the tether.

Thus, preferably the centre of mass of the tether is less than 25% of the chord length from the leading edge. More preferably it is less than 24% of the chord length from the leading edge. Typically it will be from 10% to 24%, more preferably from 15% to 24% of chord length from the leading edge.

Naturally, as the tether connects the substantially ground-level location to the platform it will carry a tension force. It has been surprisingly found that improvements in tether stability can be achieved if the centre of tension is nearer to the leading edge than is the centre of aerodynamic pressure in use.

It has been found that if the centre of tension is downstream of the centre of aerodynamic pressure, the tether may be prone to twisting so that the longitudinal axis inclines at a large angle to any wind. Once this process begins, more and more of the length of the tether will assume this altitude, potentially giving higher wind loads than if the tether is pointed in the wind.

The centre of tension is that point in a cross-section of tether about which all the moments established by the tension forces (which are directed normal to the plane of the cross-section) carried by the tether in that cross-section add up to zero.

Thus preferably the centre of tension of the tether is less than 25% of the chord length from the leading edge. More preferably it is less than 24% of the chord length from the leading edge. Typically it will be from 10% to 24%, more preferably from 15 to 24% of chord length from the leading edge.

It has been surprisingly found that improvements in tether stability can be achieved if the centre of shear is nearer to the leading edge than is the centre of aerodynamic pressure in use.

The centre of shear is the point in the cross-section of the tether through which, if a notional force is applied in the plane of the cross-section, causes no rotational forces on the tether. In other words the force applied results in pure deflection of the tether without any rotation thereof.

Thus preferably the centre of shear of the tether is less than 25% of the chord length from the leading edge. More preferably it is less than 24% of the chord length from the leading edge. Typically it will be from 10% to 24%, more preferably from 15 to 24% of chord length from the leading edge.

It has also been found that is may be optimally desirable that that the centres of mass, tension and shear are in close proximity to each other, whilst remaining nearer to the leading edge than the centre of aerodynamic pressure. Thus the centres of mass, tension and shear are preferably within a region of less than 10% of the chord length, preferably less than 5%. On occasion it is possible that one or two of these centres may be further away from the leading edge than the centre of aerodynamic pressure, but not all three if a dynamically stable system with low drag is to be achieved.

In a preferred embodiment the tether may comprise a series of vanes or aerofoils to provide lift to the tether from horizontal or near horizontal winds. The tether may also comprise fins which may be powered to provide active control.

Alternatively or additionally, the tether may comprise a plurality of flags located along the length of the conduit. Such flags have been found to prevent flutter of the non-circular cross-sectional tether.

As discussed above, with so much power available, options for enhancing the performance of the information services provided not previously available become possible.

For example, in a preferred embodiment, the apparatus comprises a gyroscopic and/or gravitational stabilisation means. Such an apparatus can act to maintain a fixed attitude in the atmosphere. This enables transmissions directed from the apparatus through the atmosphere and to the Earth's surface. Without such a stabilisation means, the movement of the apparatus would make directional transmissions more difficult.

Increased power enables highly powered telecommunication signals to be transmitted to the Earth. This can provide several advantages. For example, the signals become capable of penetrating buildings or into underground installations. Another benefit is that ground-based equipment may be able to operate with smaller antennas which are more convenient and possibly portable.

Thus the platform typically comprises information services apparatus. For example, the apparatus may comprise electromagnetic transmitters and/or receivers for delivering telecommunication services to the surface of the Earth.

In a preferred embodiment, the tether also comprises an optic fibre cable from the substantially ground level location to the elevated location to transmit and receive high bit rates to transmitters/receivers at the elevated location. From the substantially ground level location the optical fibre can be linked to ground-based centres of communication by optical fibre. In the case when the substantially ground level location is a ship, then it is desirable to arrange for an optic fibre cable to travel from the mainland under the sea to a buoy, connected by an optical fibre or other means to the ship. Communication to and from the ship can then be transmitted by optic fibre via the sub-sea optic fibre cable.

In a preferred embodiment, the apparatus employs radio-over-fibre technology.

Thus, in another aspect, the invention relates to an apparatus for providing information services at altitude, comprising a platform comprising information services apparatus at an elevated location, the platform being tethered to a substantially ground level location, the tether comprising an optic fibre cable connecting the information services apparatus to a base station in the vicinity of the substantially ground level location, wherein the base station comprises a means for modulating light by a radio signal, the information services apparatus comprising an optical-to-electronic conversion means and at least one antenna, the arrangement being operable to transmit the modulated light along the optic fibre cable to the information services apparatus where the signal is converted to electronic form and transmitted by the antenna.

Typically the radio signals will be wireless signals, e.g. of a few GHz frequency.

Radio-over-fibre is particularly advantageous because there is very low signal attenuation in transmission to the platform and most of the information processing apparatus can be located at the base station thus reducing the weight of the platform. An additional advantage is the possibility of developing the type of service without changing the equipment at altitude.

Thus, typically modulation and switching functions can be carried out at the base station. Other functions such as frequency up-conversion and multiplexing can also be performed at the base station. Thus some of the information services apparatus only require optoelectronics and amplification functions at the platform.

It has also been found that for many applications translational movement of any apparatus at altitude is much less problematic than rotational movement. For communication at large distances, even a small change in the direction of a directed transmission will result in the transmission or reception to and from the Earth being significantly off target. However, if the direction can be fixed or particularly the angular velocity minimised, then translational movements only result in relatively small deviations from the target. Thus, it has been found that translational movement due to winds can be more easily tolerated than rotational movement.

Thus, in another aspect, the invention relates to an apparatus for providing information services at altitude comprising a platform comprising information services apparatus at an elevated location, the platform being tethered to a substantially ground level location, wherein the platform is contained within a shroud to which it is not rigidly connected. Typically the platform is connected to the tether by a bearing arrangement that allows free rotation with respect to the tether.

It has been found that the platform is protected from the high winds by being located within a shroud. Furthermore, as the platform is not rigidly connected to the shroud or the tether, any rotational movement experienced by the shroud or the tether is not transferred to the platform.

The shroud thus shields the platform from the winds and provides a volume of quiescent air or gas within which the platform is mounted. Thus, although translational movement of the shroud can be transferred, little or no rotational movement is transferred and directed information services are significantly improved.

In a preferred embodiment the shroud is a balloon and the platform can be suspended by the tether but free to rotate in all planes with respect to the tether. For example, the shroud may be a balloon suspended beneath a larger balloon or dirigible providing the lift for the platform.

Furthermore, the benefit of the shroud is further and significantly enhanced if it is combined with a gyroscopic and/or gravitational stabilisation means, as discussed above. In such an embodiment, a very stable attitude can be achieved, providing for significantly enhanced directed information services.

It is furthermore desirable if it is combined with the fuel fluid aspect of the invention discussed above.

The tether and platform according to the invention may also be susceptible to lightning strikes. Such strikes can be very hazardous, particularly if a fuel fluid is passing through a conduit in the tether. Thus, preferably the conduit is non-electrically conducting. This can be achieved, for example, by ensuring that any metal components of the tether are broken every so often, e.g. every few meters, to break any electrical pathway. Alternatively the conduit may be essentially free of electrically conductive elements.

Whilst the conduit is preferably non-electrically conductive, the tether itself may be non-electrically conductive too or alternatively may comprise a lightning strike conductor electrically connecting the substantially ground level location to the platform. Thus, any lightning strikes would be carried by the conductor and not influence the non-conductive conduit.

In another aspect, the invention relates to an apparatus for providing information services at altitude comprising a platform comprising information services apparatus at an elevated location, the platform being tethered to a substantially ground level location, wherein the tether comprises at least two electrical power cables operable to transport electrical power from the ground level location to the platform.

In this embodiment, it will not be possible to ensure that the tether is non-electrically conducting. Therefore, preferably the tether also comprises a lightning strike conductor electrically connecting the substantially ground level location to the platform. In one embodiment the lightning strike conductor may one of the electrical power cables in a non-insulated form. Thus, although lightning strikes may not be prevented, their effect can be greatly minimised by providing the electrically conductive path in the tether.

For example, the lightning strike conductor may comprise an aluminium strip or other conducting material, preferably with a cross-section of from 100-400 $mm^2$ cross-section area.

It is also preferred that the power cable or cables are insulated. It has been found that high voltage cables from 3.3 kV to 330 kV are suitable.

It has also been found that there is a risk that water may form a conductive pathway on the outside of the tether. Thus, if it is non-conducting the water can nevertheless provide a conductive pathway and the problem of lightning strikes remains a problem.

Thus, in another aspect, the invention relates to an apparatus for providing high altitude services, comprising a platform at an elevated location, the platform being tethered to a substantially ground level location, wherein the tether is coated with a hydrophobic material.

Thus, if any liquid forms on the surface of the tether it will generally not form continuous pathways, thus preventing the possibility of an electrical pathway forming. Additionally, other potentially problematic situations may be avoided by preventing the formation of ice on the tether which can promote aerodynamic instability in particular in the case of non-circular tethers.

It is also preferable if the tether comprises a moveable vehicle which is operable to inspect the tether for damage, possibly make minor repairs and providing a de-icing capability.

As such high altitude platforms will generally be located in the vicinity of human population areas, consideration with respect to aircraft safety and regulations must also be given. One such safety consideration is the requirement that the tether contain a multitude of lights which may operate continuously or intermittently, in order to alert aeroplane pilots of the presence of the tether.

However, providing lights and providing sufficient power along the length of the tether can involve significant weight increases, which in general are to be avoided. Thus, a system which can provide such lighting without significant additional weight would be highly desirable.

Thus, in another aspect, the invention relates to an apparatus for providing high altitude services, comprising a platform at an elevated location, the platform being tethered to a substantially ground level location, wherein the tether comprises an optic fibre cable at least substantially from the substantially ground level location to the platform, the optic fibre cable comprising a plurality of couplers spaced along the length of the optic fibre cable, each coupler adapted to divert a fraction of the light in the optic fibre cable and direct it to a respective light emission means.

Typically the light emission means comprises a collimator and may, for example, comprise one or more lenses, some mirrors or diffraction gratings (either conventional or holographic).

The light transmitted along the optic fibre cable is preferably intermittent, in order to provide a flashing light effect at the respective light emissions means.

In a preferred embodiment the light emission means are evenly spaced apart. Spacing between the light emission means can be from 50 to 200 m.

Thus, such a tether may comprise from 20 to 200 such light emitting means. Thus, the amount of light diverted by each coupler is preferably in the range of from 0.5 to 5.0% of the light in the optic fibre at that point.

The optic fibre in this embodiment is typically a different optic fibre employed for conveying optical signals for use with information services apparatus according to other aspects of the invention.

Such an arrangement is low weight, compact, can present little additional wind resistance and involves no local power requirements, thus simplifying the apparatus required.

Any of the features disclosed herein in relation to the high altitude platform may be combined with any other feature to provide embodiments according to the invention.

The high altitude platform invention will now be illustrated, by way of example and with reference to the following figures, in which:

Turning to the figures, FIG. 8 shows an apparatus according to the invention comprising a high altitude platform 4 supported by a balloon 3 and a tether 2. The tether is attached to a ship 1 located at sea level, being a ground level location.

The platform 4 comprises an electrical generator in the form of a fuel cell, although it could be a gas engine, jet engine or a diesel engine and the like.

The platform 4 also comprises a variety of information services apparatus, such as internal antennas, multi networks for wireless internet, a 700 horn antennae to supply 1 to 20 km diameter cells, television transmitters, GPS transmitters, aircraft warning systems, e.g. radar reflectors and light strobes.

The tether 2 comprises a Kevlar™ pipe with a 15 mm outside diameter and 12 mm inside diameter made of composite material with a PTFE liner. The pipe is reinforced by four additional Kevlar™ cables of 15 mm diameter to provide a cross-section to the tether which is non-circular.

Balloon 3 is 600,000 cubic meters capacity of ellipsoid shape with a horizontal diameter of 158 m and a vertical height of 46 m and is filled with helium to support the platform 4 which weighs 8 metric tonnes.

The ship 1 comprises a store of hydrogen, and optionally a hydrogen generation plant, and can pressurise the hydrogen to 350 bar pressure by two high pressure compressors (not shown) so that it can flow up the tether to the platform 4. Once the hydrogen arrives at the platform it passes to the fuel cell, whereupon electrical energy is generated at altitude. The electrical energy produced is typically from 100 to 10,000 kW, e.g. 1000 kW, and is more than enough to provide high strength signals for use with the information services apparatus.

FIG. 9 shows a cross-section through a portion of the tether 2 used in FIG. 8. The tether 2 comprises a conduit 6 which carries the fuel fluid, e.g. hydrogen. It is strengthened by a wall 8 of composite material.

Also provided are four strengthening cables 10 which do not carry fuel fluid but are there to lend strength to the tether. Also provided is a tail portion 12 and a fin portion 14 attached to tail portion 12 by a ring or actuator 16. The tether is surrounded by a skin 18 to maintain integrity of the tether 2. The elongate nature of the cross-section helps to reduce horizontal drag induced by high cross-winds. The actuator 16 may be operable to provide active control to prevent adverse tether movement.

Figure 10:
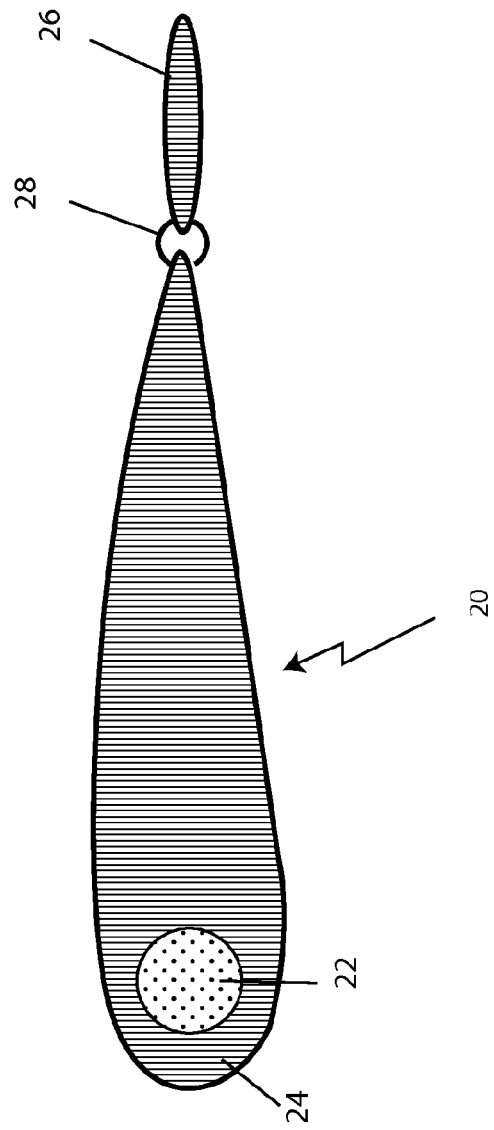

FIG. 10 shows a cross-section through a portion of another tether 20 for use with the present invention. Tether 20 comprises a fuel conduit 22 embedded in a non-circular composite material 24. Also provided is a fin 26 attached to tether 20 by ring or actuator 28. The actuator 28 may be operable to provide active control to prevent adverse tether movement.

Figure 11:
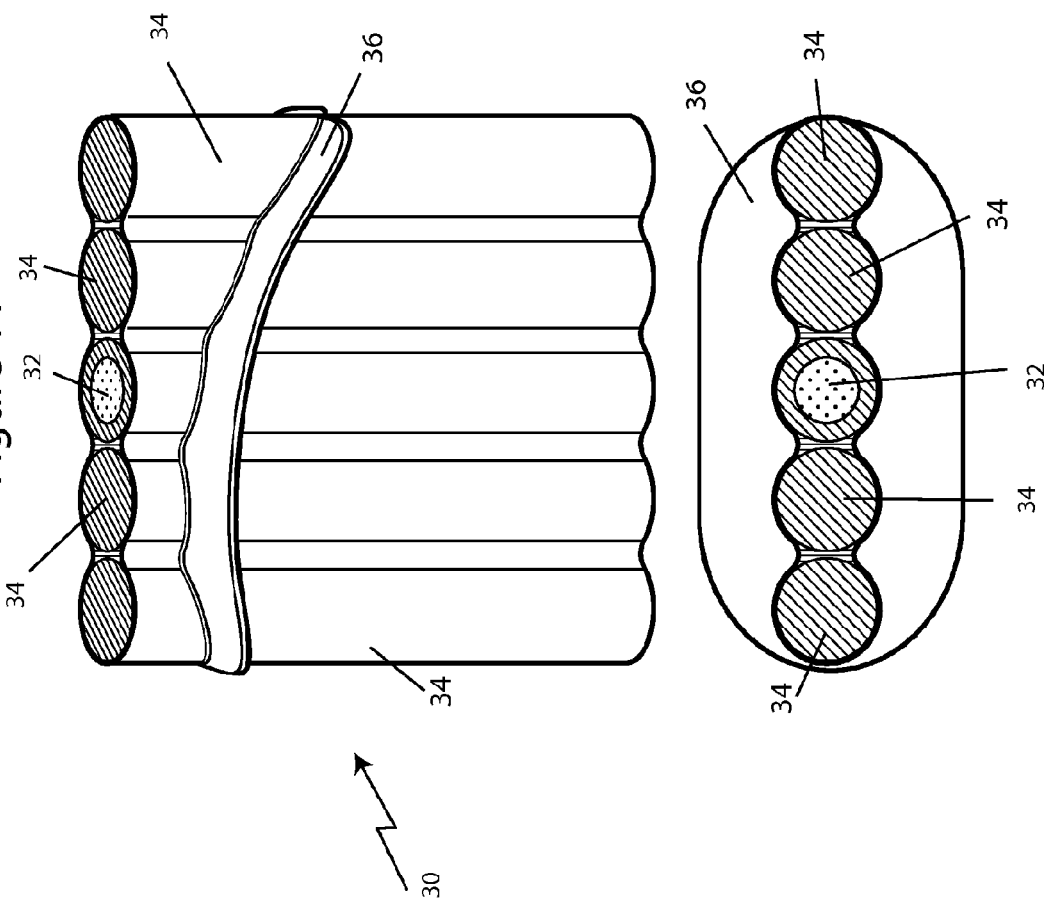

FIG. 11 shows a view of a portion of another tether 30 for use with the present invention. Shown is a central conduit 32 carrying fuel fluid surrounded on each side by two strengthening cables 34.

Also provided is a vane 36 which acts to provide lift to the tether when high lateral winds flow past the tether. This helps to prevent blow over of the platform.

Figure 12:
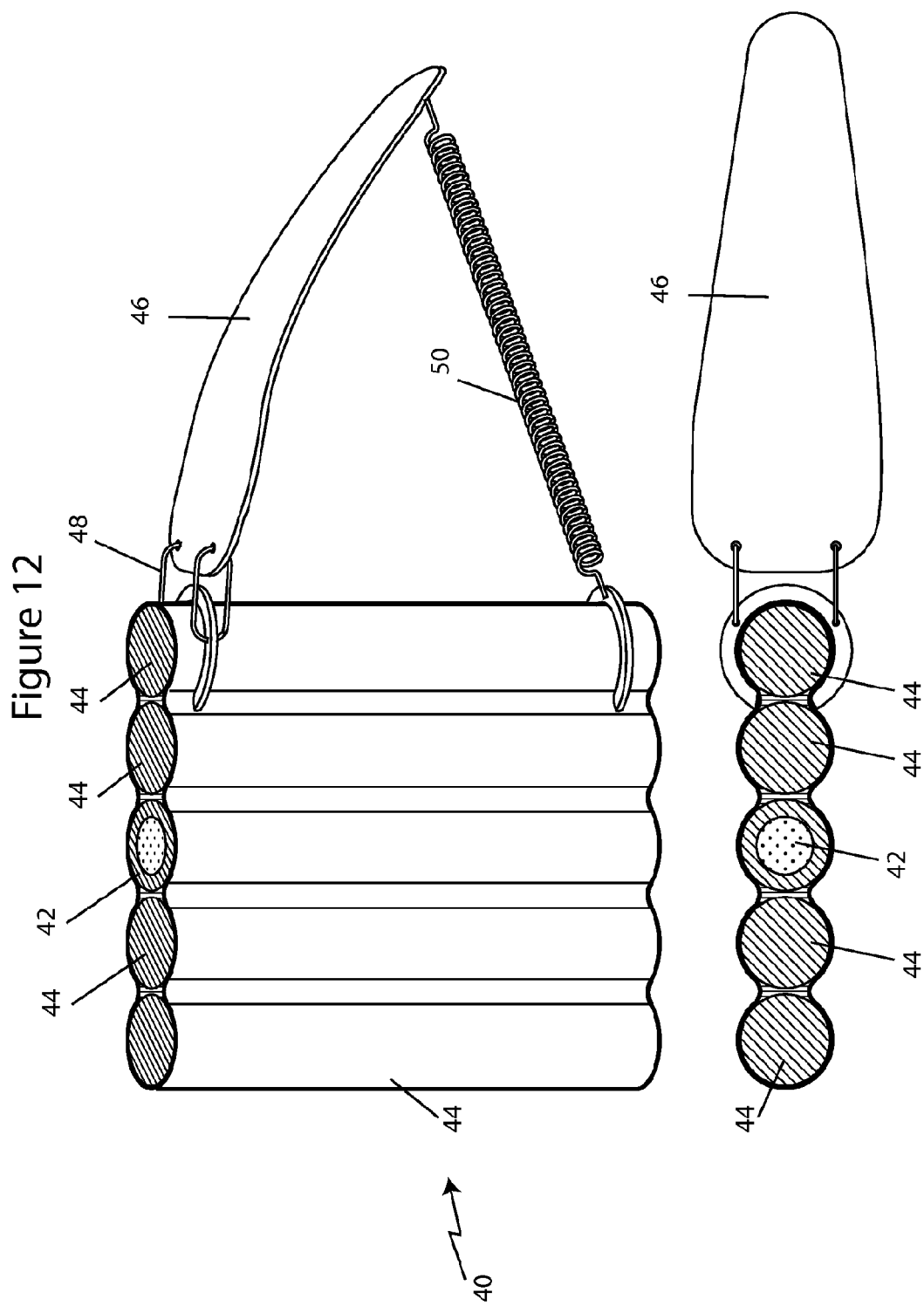

FIG. 12 shows a view of a portion of another tether 40 for use with the present invention. Shown is a central conduit 42 for carrying fuel fluid surrounded on each side by two strengthening cables 44.

Also provided is a vane 46 attached to a strengthening cable 44 by links 48 and spring 50. In use, vane 46 provides lift to the tether 40 when strong lateral winds flow past the tether.

Figure 13:
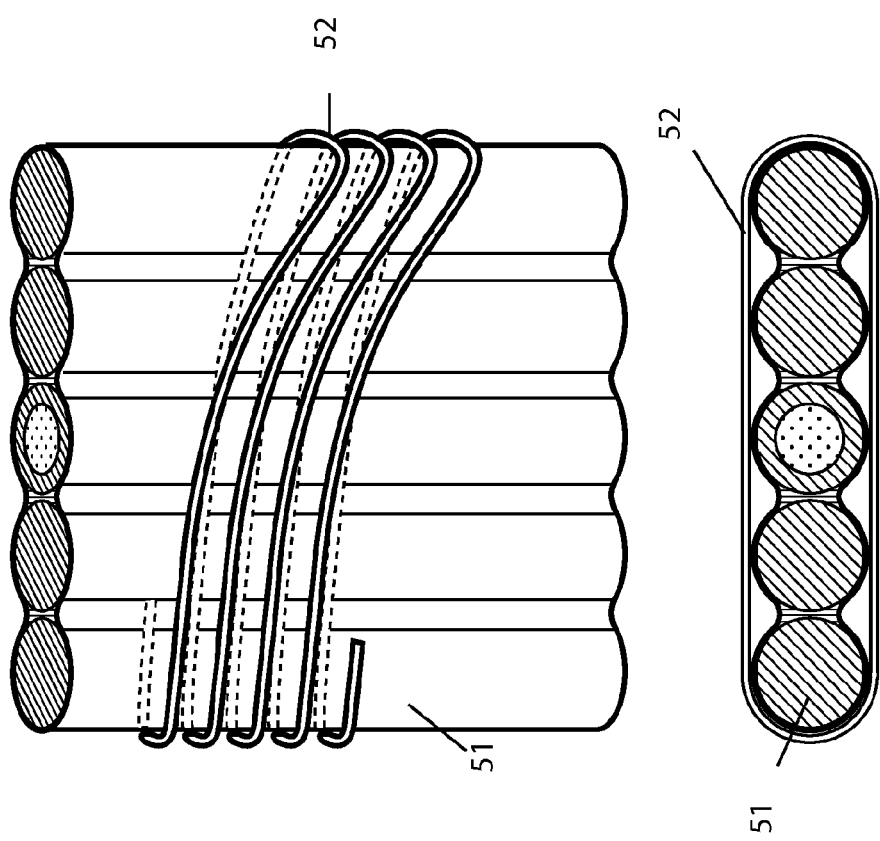

FIG. 13 shows another form of lifting vanes being wound onto the tether. The diameter of the vanes 52 may be from 0.2 to 10 mm, but is typically around 1 mm, with 4 mm vertical spacing. The winding may or may not be continuous along the length of the tether. Preferably the winding is present between 7000 m and 13000 m altitude.

Figure 14:
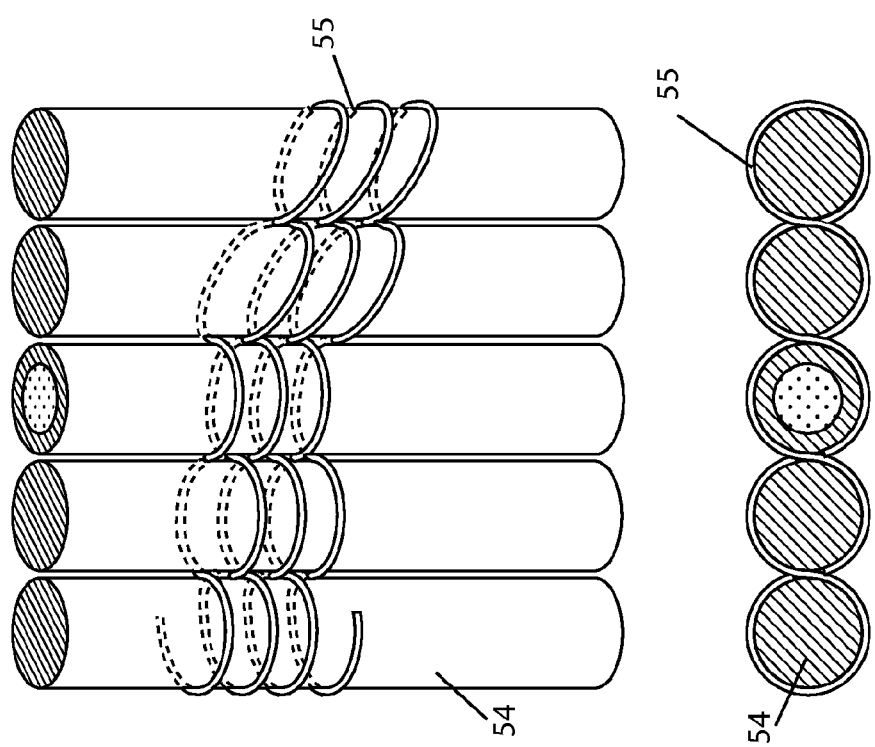

FIG. 14 shows a further means of construction with the vanes 55 being interlaced with the tether cables.

Figure 15:
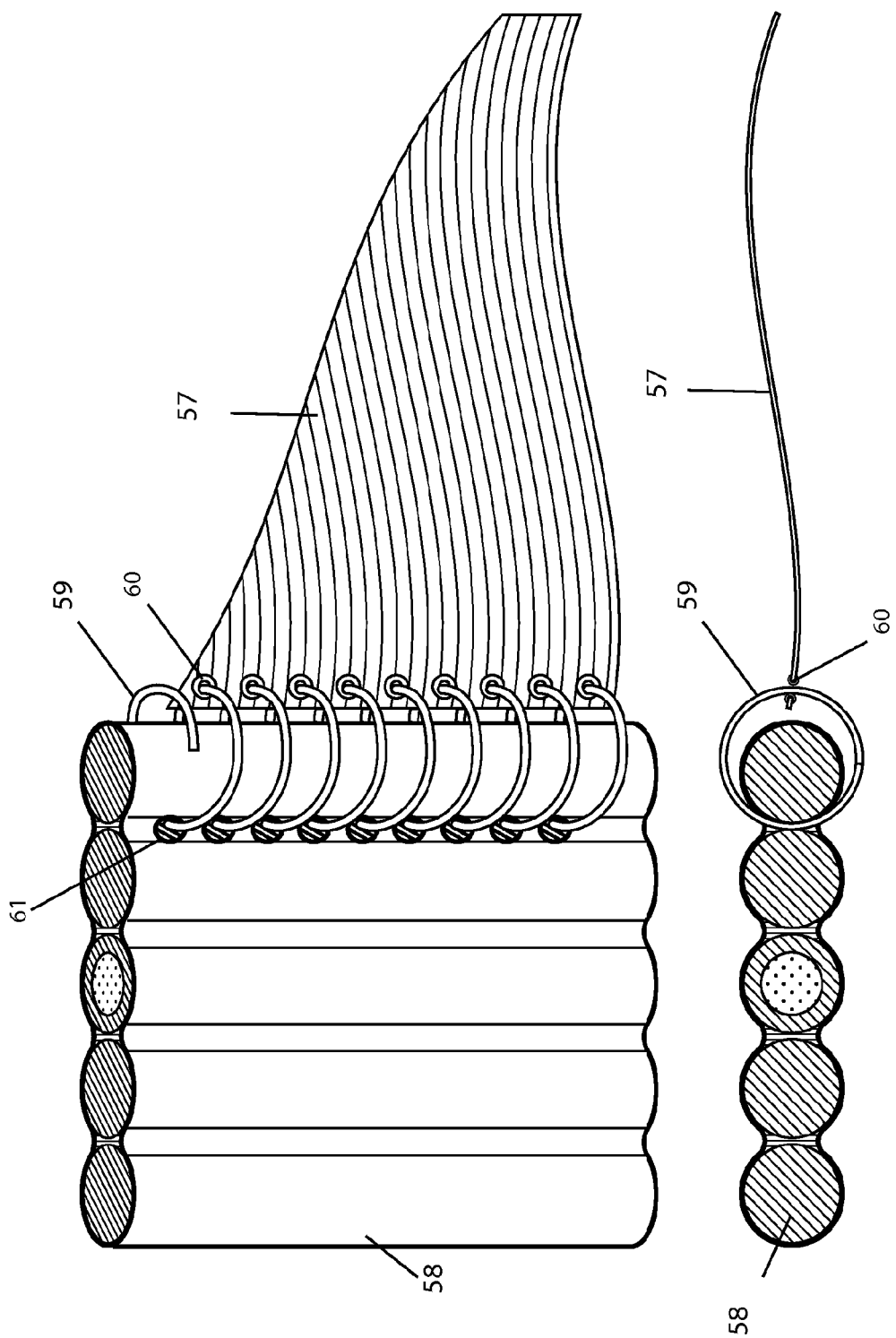

FIG. 15 shows a view of a portion of another tether 58 for use with the present invention. The tether comprises a flag 57 attached to the tether by a coil 59 and holes 60 in the flag. The flag could alternatively be a simple wire to prevent flutter of the non-circular cross-section of tether in high winds.

Figure 16:
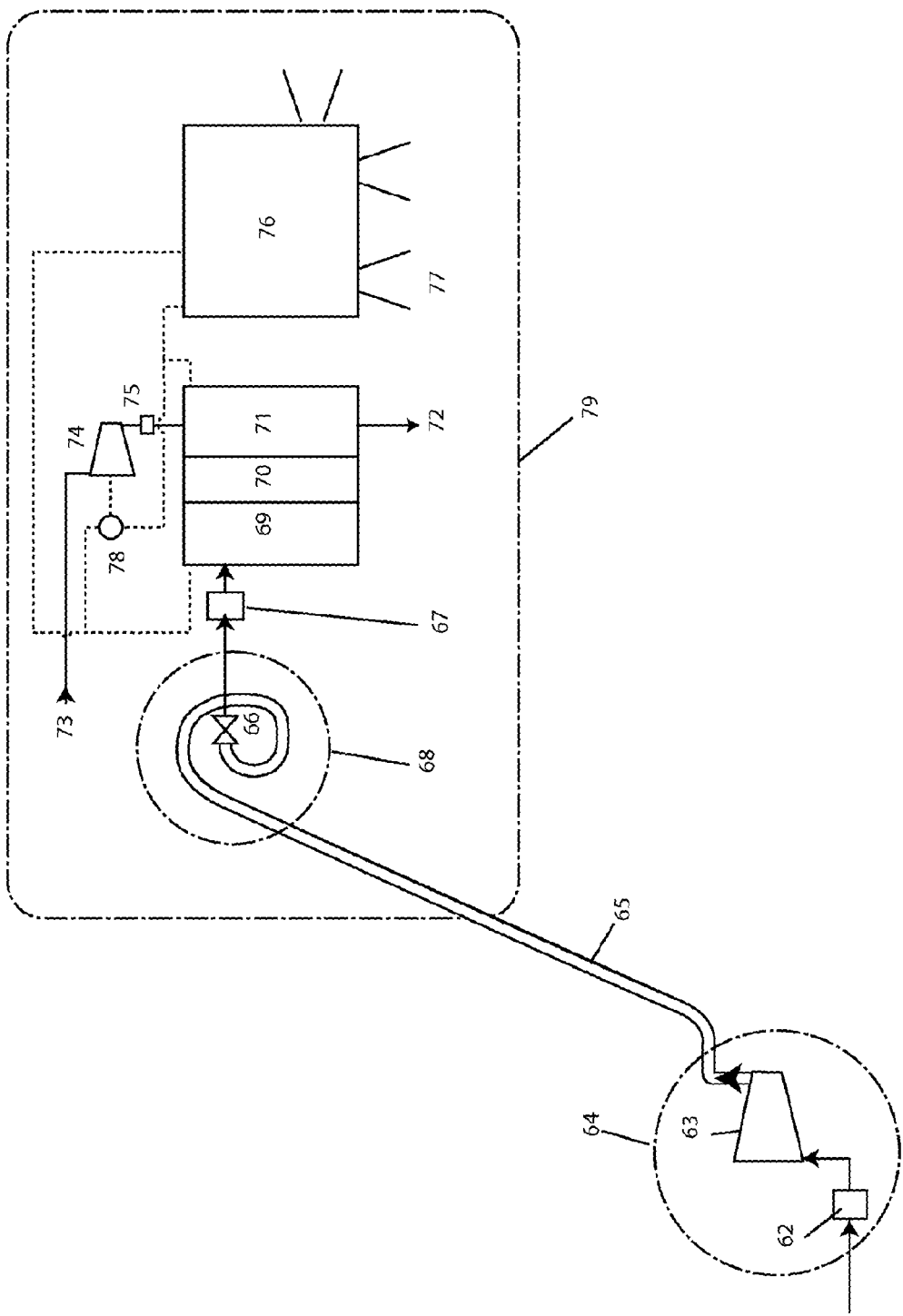

FIG. 16 shows more detail of the fuel management system and the platform shown in FIG. 1. Shown is a hydrogen pressurisation system within a spool 64 at the ground level location, conduit 65 and platform 79.

The pressurisation system within a spool 64 comprises a low pressure slip seal 62, through which the hydrogen passes to a compressor 63 prior to the hydrogen flowing up the conduit 65 in the tether.

Once at the platform 79, the conduit enters an upper spool 68 with a let down valve 66. In another embodiment the spool 68 may be omitted. The hydrogen then flows to past a slip seal 67 into the fuel cell made up of an anode 69, a membrane 70 and a cathode 71. Atmospheric air 73 is compressed in compressor 74 passed through dehumidifier 75 before entering the cathode 71. Water is expelled via outlet 72.

Power from the fuel cell drives a motor 78 which in turn drives the compressor 74. Other uses of the power are the payload electronics 76 supplying transmitters 77 as well as any platform stabilisers (not shown).

Figure 17:
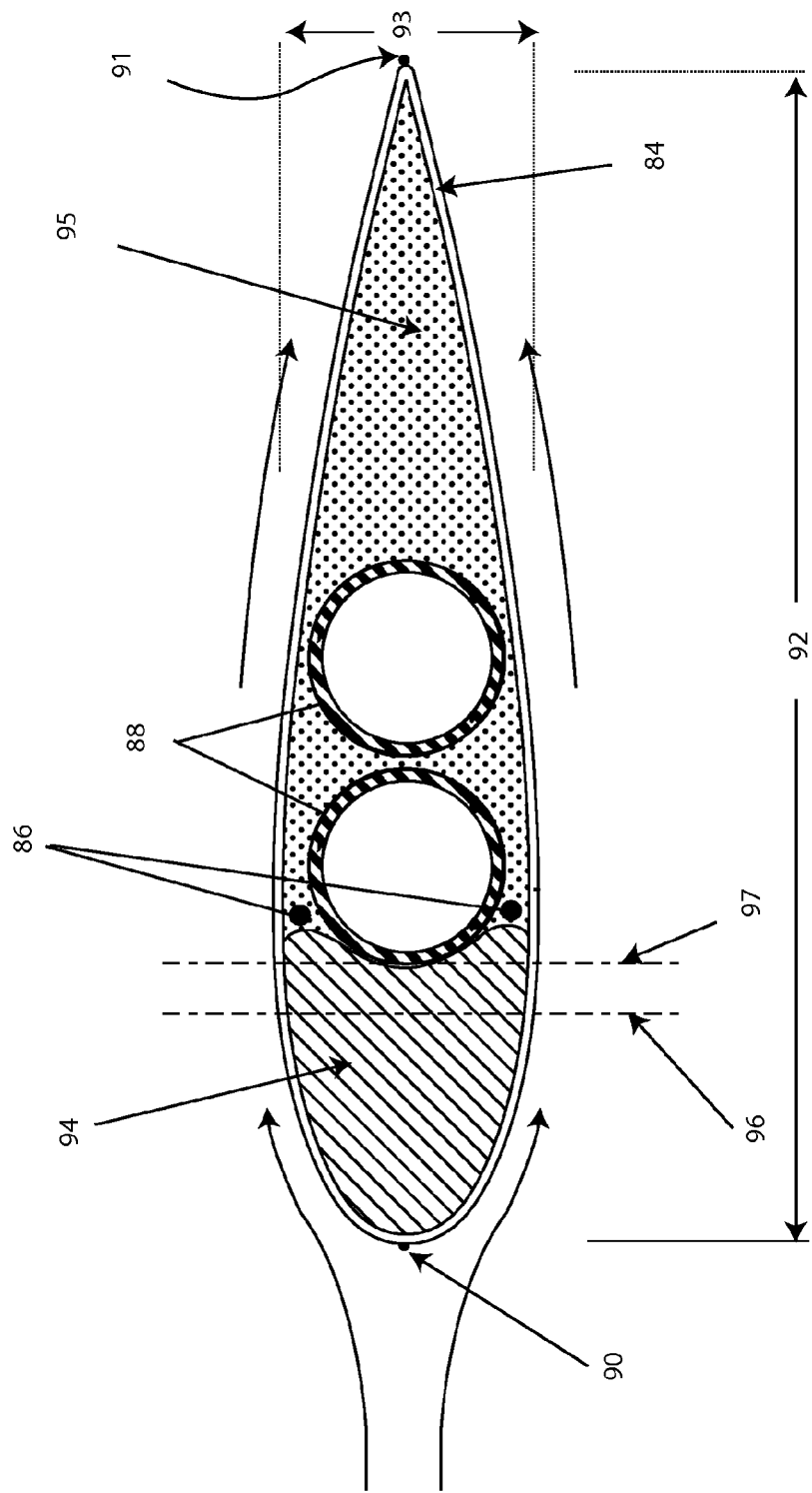

FIG. 17 shows a section through a tether according to the present invention. The tether comprises a skin 84 which contains two optical fibre cable bundles 86 and two conduits or cables 88. The cross-section is non-circular and elongate with an aspect ratio of about 4. In use, air flows from left to right, defining a leading edge 90 and a trailing edge 91. Also defined is the chord length 92 and the chord width 93. At 90 and 91 there are small optical fibres providing an external light source.

The cross-section is filled at the leading edge with aramid 94 and the remainder filled with low density foam 95. The relative densities of the elements of the cross-section through the tether are such that the centre of mass is provided along line 96, and being symmetric close to the chord line.

As air flows from the leading edge to the trailing edge, the centre of aerodynamic pressure is located on line 97. As the centre of mass 96 is nearer the leading edge 90 than is the centre of aerodynamic pressure 97, the arrangement shown is stable. Thus the design of tether exposes its minimum area to the flowing air and thus experiencing minimised wind resistance.

Figure 18:
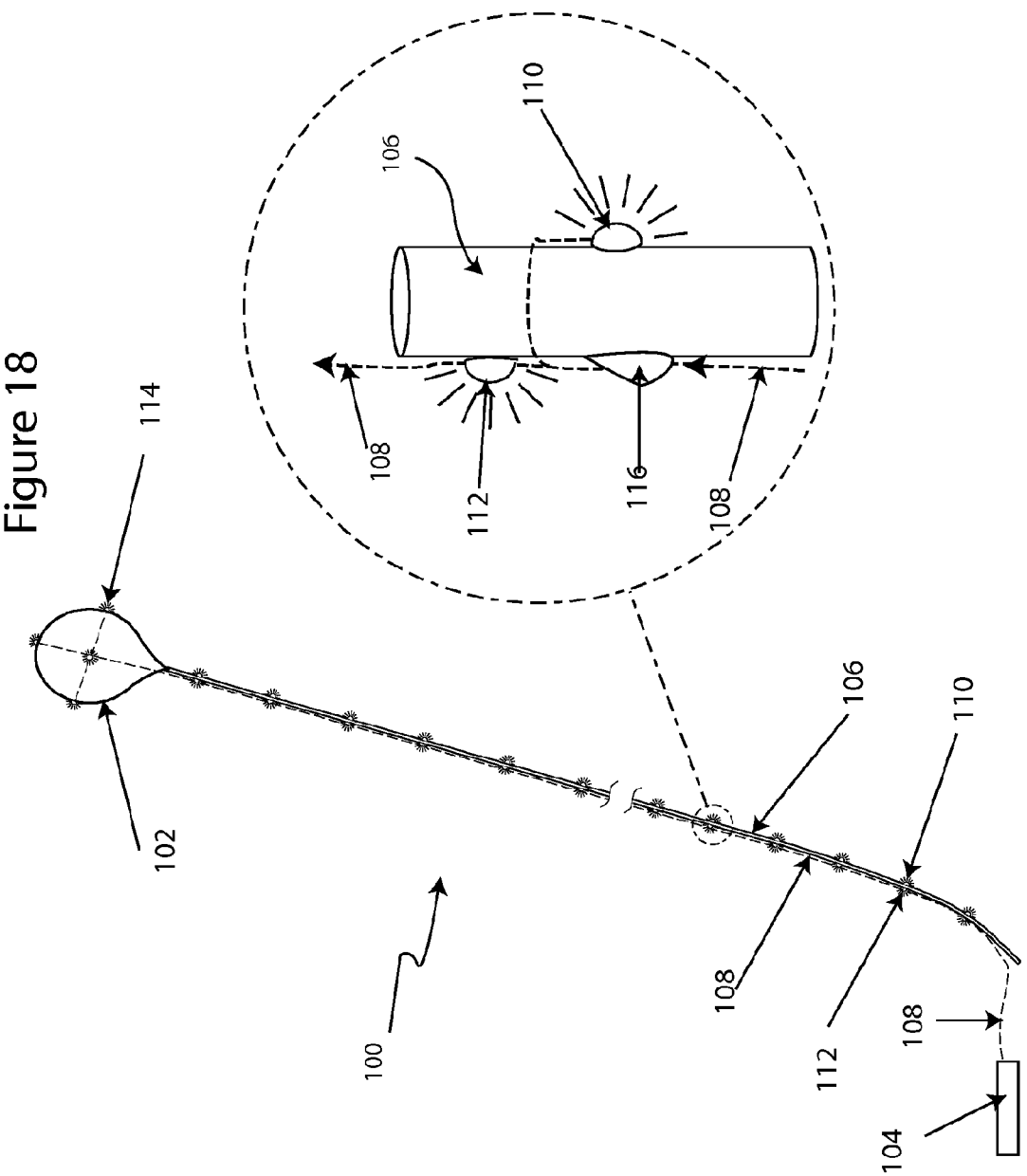

FIG. 18 shows an apparatus 100 according to the invention comprising a balloon or dirigible 102 connected to a base station (not shown) by a tether 106. The tether comprises an optic fibre cable 108 travelling from an intermittent light source 104 to the balloon or dirigible 102.

Spaced along the optic fibre 108 is a plurality of lights 110, 112 with lights 114 around the balloon or dirigible 102. As shown in more detail, optic fibre cable 108 enters a coupler 116 which diverts a fraction of the light in the optic fibre to light 110 and 112. The majority of the light remains in the optic fibre and travels to the next pair of lights, where the same process is carried out. At the balloon or dirigible 102 the remaining light is diverted equally to the lights 114.

Thus, safety lights are provided in a lightweight, compact and low wind resistance form.

Figure 19:
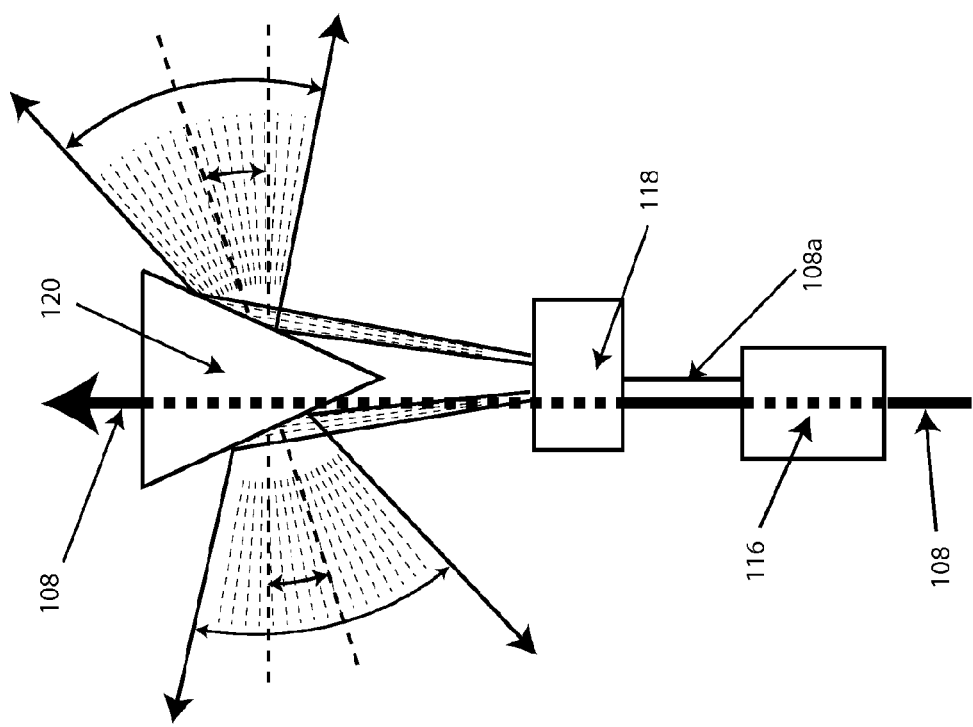

FIG. 19 shows in detail the operation of a coupler 116 to provide light emission. Light from the optic cable 108 enters the coupler 116, whereupon a fraction of light 108a is diverted and directed to grating 118. The majority of the light passes through the coupler 116 and is not diverted. The diverted light exits the grating 118 and is directed onto reflective cone 120 which reflects the light in a wide angle to provide the light emission means. Other methods of distributing the diverted light to provide the light emission means can be readily conceived of.

The invention claimed is:

1. An apparatus for transporting and dispersing solid particles into the earth's atmosphere, comprising a conduit connecting a substantially ground level location to an elevated location, a particle transport means for conveying solid particles through the conduit from the substantially ground level location to the elevated location, and a deagglomeration means coupled with a dispersal means, wherein the deagglomeration means and dispersal means are located at the elevated location, wherein the solid particles have a refractive index greater than 2.0, wherein substantially all of the solid particles are sub-micron particles, and wherein the elevated location is in the stratosphere.

2. The apparatus according to claim 1, further comprising a source of the solid particles connected to the conduit for transportation through the conduit.

3. The apparatus according to claim 2, wherein the solid particles include particles of titanium dioxide, sodium chloride, silicon or mixtures thereof.

4. The apparatus according to claim 3, wherein the solid particles transported via the conduit have a mean particle size in the range of from 0.01 to 1.3 μm.

5. The apparatus according to claim 4, wherein the solid particles have a bimodal size distribution with peaks in the visible and ultra violet wavelengths respectively.

6. The apparatus according to claim 1, wherein the solid particles have a bimodal size distribution with peaks in the visible and ultra violet wavelengths respectively.

7. The apparatus according to claim 2, wherein the solid particles have been prepared by drying or chemical reaction or a combination thereof, to have a solar radiation absorption of at least 90% less than that produced by an equivalent weight of water with the same particle size distribution as the solid particles and at wavelengths of about 2 microns by removal of sufficient absorbed water, hydroxyl groups or polar molecules.

8. The apparatus according to claim 2, wherein the solid particles are coated with coating material.

9. The apparatus according to claim 8, wherein the coating material is hydrophobic.

10. The apparatus according to claim 9, wherein the coating material comprises materials selected from sulphate groups, phosphate groups, silanes, siloxanes, and mixtures thereof.

11. The apparatus according to claim 2, wherein the solid particles are in a carrier fluid.

12. The apparatus according to claim 11, wherein the particle transport means comprises a carrier fluid pressurisation means.

13. The apparatus according to claim 11, wherein the solid particles are present in a concentration of from 5 to 50% by volume.

14. The apparatus according to claim 11, wherein the carrier fluid has a temperature of from −80 to 150° C. at an entry to the conduit.

15. The apparatus according to claim 11, wherein the carrier fluid has a pressure greater than 100 MPa at an entry to the conduit.

16. The apparatus according to claim 11, wherein the carrier fluid has a temperature of from −80 to 150° C. and a pressure greater than 100 MPa at an entry to the conduit, and wherein the carrier fluid is a supercritical fluid.

17. The apparatus according to claim 11, wherein the carrier fluid includes fuel gases.

18. The apparatus according to claim 1, wherein the conduit is at least 5000 m to enable it to reach the elevated location.

19. The apparatus according to claim 1, wherein the conduit has an internal diameter of from 1.0 to 30 cm.

20. The apparatus according to claim 1, wherein the conduit comprises reinforcing elongate fibrous material, the fibrous material being wound at an angle to the central axis of the conduit, wherein the angle is greater at one end of the conduit than at the other end of the conduit.

21. The apparatus according to claim 20, wherein the end of the conduit having the greater angle of winding is at the substantially ground level location.

22. The apparatus according to claim 20, wherein the angle of winding at one end of the conduit is from 30 to 80° to a line parallel to the central axis of the conduit, and wherein the angle of winding at the other end of the conduit is less than 30° to a line parallel to the central axis of the conduit.

23. The apparatus according to claim 1, wherein the dispersal means includes a means for dispersing the solid particles into a high velocity air stream.

24. The apparatus according to claim 1, further comprising one or both of electrical power located at an elevated location and fuel lines along the conduit.

25. The apparatus according to claim 1, further comprising a let-down facility at the elevated location.

26. The apparatus according to claim 1, wherein the particle transport means is configured to transport the solid particles through the conduit at least at 500 metric tonnes per 12 hours.

27. The apparatus according to claim 1, wherein the deagglomeration means comprises a microniser, a venturi nozzle, or a combination thereof.

28. The apparatus according to claim 1, wherein the dispersal means is close-coupled to the deagglomeration means.

29. The apparatus according to claim 1, further comprising a balloon, dirigible, or airship, coupled to the conduit.

30. The apparatus according to claim 29, wherein the balloon, dirigible, or airship is configured to provide a lifting force of at least 15 metric tonnes.

31. The apparatus according to claim 1, further comprising a ship at the substantially ground level location, wherein the conduit is coupled to the ship.

32. A method of transporting solid particles into the earth's atmosphere, the method comprising transporting the solid particles via a conduit from a substantially ground level location to an elevated location, deagglomerating the solid particles at the elevated location, and dispersing the solid particles into the atmosphere, wherein the solid particles have a refractive index greater than 2.0, wherein substantially all of the solid particles are sub-micron particles, and wherein the elevated location is in the stratosphere.

33. The method of claim 32, wherein the method results in a manmade cloud of solid particles located in the stratosphere, wherein the cloud comprises at least 1,000 tonnes of the solid particles over a region of at least a thousand square kilometers.

34. The apparatus of claim 1, wherein the solid particles have a ratio of a real part of a complex refractive index at 500 nm to an imaginary part of the complex refractive index that is greater than 5.

35. The method of claim 32, wherein the solid particles have a ratio of a real part of a complex refractive index at 500 nm to an imaginary part of the complex refractive index that is greater than 5.

* * * * *